United States Patent [19]

Mattson

[11] Patent Number: 5,491,551
[45] Date of Patent: Feb. 13, 1996

[54] APPARATUS AND METHOD FOR FTIR SPECTROMETER WITHOUT COMPENSATOR

[75] Inventor: David R. Mattson, Madison, Wis.

[73] Assignee: Analytical Technology, Inc., Boston, Mass.

[21] Appl. No.: 20,523

[22] Filed: Feb. 22, 1993

[51] Int. Cl.⁶ ................. G01B 9/02; G01B 9/08
[52] U.S. Cl. ............ 356/346; 356/352; 250/237 G
[58] Field of Search ..................... 356/341, 346, 356/350, 345, 358, 374; 250/346, 352, 330, 237 G, 227.27

[56] References Cited

U.S. PATENT DOCUMENTS

| | | | |
|---|---|---|---|
| 4,190,366 | 2/1980 | Doyle | 356/374 |
| 4,193,693 | 3/1980 | Schindler | 356/346 |
| 4,480,914 | 11/1984 | Thompson et al. | 356/346 |
| 4,542,295 | 9/1985 | Mattson et al. | 250/352 |
| 4,764,676 | 9/1988 | Doyle | 356/432 |
| 4,795,253 | 1/1989 | Sandridge et al. | 356/346 |
| 4,843,242 | 6/1989 | Doyle | 250/330 |
| 4,927,269 | 5/1990 | Keens et al. | 356/346 |
| 4,999,010 | 3/1991 | Mattson et al. | 356/346 |
| 5,225,926 | 7/1993 | Cuomo et al. | 359/350 |
| 5,241,179 | 8/1993 | Carrieri | 250/341 |

*Primary Examiner*—Robert P. Limanek
*Assistant Examiner*—Alexander Oscar Williams
*Attorney, Agent, or Firm*—Emrich & Dithmar

[57] ABSTRACT

A Fourier-transform (FT) infrared (IR) spectrometer includes a Michelson interferometer without an IR beam compensator. An input IR beam is directed through a substrate and a beamsplitter attached to the substrate for support, with the input IR beam divided by the beamsplitter into a first beam portion incident upon a fixed retroreflector and a second beam portion incident upon a movable retroreflector. The first and second beam portions are then recombined to provide an uncompensated output IR beam with an interference pattern which is directed onto a sample to provide an uncompensated interferogram. The uncompensated interferogram is converted from a time domain to a frequency domain via a Fourier-transform to provide a complex intermediate spectrum, followed by a calculation of a corrected phase angle in terms of wavenumber arising from the substrate's optical thickness. The complex intermediate spectrum is then rotated by a negative of the corrected phase angle. An inverse Fourier-transform is used to form a corrected real compensated intermediate interferogram. The corrected real compensated intermediate interferogram is then Fourier-transformed into a spectrum using a conventional approach to remove asymmetric noise and correct for small phase errors.

6 Claims, 16 Drawing Sheets

APPARATUS AND METHOD FOR FTIR SPECTROMETER WITHOUT COMPENSATOR

FIELD OF THE INVENTION

This invention relates generally to the spectroscopic analysis of the chemical composition of a sample and is particularly directed to apparatus and a method for analyzing the chemical composition of a sample using a spectrometer incorporating a Michelson interferometer without a beam compensator.

BACKGROUND OF THE INVENTION

Fourier spectroscopy for analyzing the composition of a sample frequently employs a two-beam interferometer such as a Michelson interferometer wherein an optical beam is divided by partial reflection into two separate wavefronts, one directed along a fixed-length arm and the other directed along a variable-length arm which is varied to cause spectral scanning. The basic elements of a conventional Michelson interferometer 10 are shown in simplified schematic diagram form in FIG. 1.

Incident electromagnetic radiation $E_{in}$ from a light source 12 is divided into two separate beams by a beamsplitter 14. One beam $E_{rf}$ is reflected to a fixed retroreflector 24 shown in FIG. 1 as a cube corner mirror. This reflected beam $E_{rf}$ is reflected back to the beamsplitter 14 where only one-half of its intensity is transmitted as a portion of the output beam $E_{out}$. The second beam $E_{tr}$ is transmitted to a movable retroreflector 22 which reflects this radiation back to the beamsplitter 14 where one-half of its intensity is reflected to contribute the second portion of the output radiation, or beam, $E_{out}$. The output radiation beam $E_{out}$ is provided to a detector 26 and appropriate signal processing circuitry which is not shown in the figure for simplicity.

The two equal portions of the incident electromagnetic wave $E_{rf}$ and $E_{tr}$ are passed along separate paths and are then recombined. By changing the position of the moveable retroreflector 22 relative to the fixed retroreflector 24 by means of displacement means 21, the recombined output beam $E_{out}$ will undergo constructive or destructive interference. The following equation defines the relationship between the wavenumber (or number of wavelengths per centimeter of the wave) and its frequency f.

$$f = c\sigma \qquad (1)$$

For an infrared (IR) interferometer wavenumbers σ are on the order of 1000 per cm, for measurements of light (having a speed c), where $$E_{out} = \frac{1}{4} A_{in} e^{2\pi i (ft + z_{rf}\sigma)} + \frac{1}{4} A_{in} e^{2\pi i (ft + z_{tr}\sigma)} \qquad [Eq. 2]$$

This wavelength leads to a very high frequency (on the order of $10^{13}$ Hz). There are no practical methods for detecting wave amplitudes of these frequencies directly. Detectors sensitive to radiation of this frequency and wavelength detect the power density transmitted by the wave in a square law fashion. The physical principle for computing the power carried by the output beam $E_{out}$ may be computed by multiplying the wave amplitude function given by equation 2 with its complex conjugate. The conjugate of a complex number is itself a complex number with an equal real part and an imaginary part equal to the negative of the imaginary part of the number as given by the following $$P_D = \frac{1}{8} A_{in}^2 + \frac{1}{16} A_{in}^2 (e^{2\pi i z_{rf}\sigma - 2\pi i z_{tr}\sigma} + e^{-2\pi i z_{rf}\sigma + 2\pi i z_{tr}\sigma}) \qquad [Eq. 3]$$

The expression for the signal recorded by a square law detector measuring the power of the output radiation of the interferometer is derived by simplifying Eq. 3 to the following form $$P_D = \frac{1}{8} A_{in}^2 + p_D \cos(2\pi i x\sigma) \qquad [Eq. 4]$$

The constant term (with respect to x) represents a bias power that is one-half of the incident power. The cosine term (as a function of x and σ) exemplifies the application of the interferometer to spectroscopy (and other applications). For simplicity sake we will drop the constant term $\frac{1}{8}A_{in}^2$, since it is not of interest in this discussion.

The practical use of the interferometer for spectroscopic applications involves the generation of a waveform by scanning the one retroreflector which has the effect of varying the retardation (x) over a continuous finite range of values. For a monochromatic light source, a single constant wavenumber σ value, the scan will generate a cosine wave of amplitude P-detector and of frequency σ, frequency being one over the distance in this case rather than one over time as in the usual case. Equation 4 expresses this behavior concisely. FIG. 2 is a graphic representation of equation 4 where detected power $P_D$ is plotted along the vertical axis and scanning mirror position, or retardation, x is plotted along the horizontal axis.

In most cases, it is not possible to support the beamsplitter 14 in a freestanding mode as shown in FIG. 1. The beamsplitter is typically comprised of a substrate which is soft, malleable and fragile. For the infrared, near infrared, or visible spectral regions the beamsplitter will generally take the form of a very thin film of dielectric material such as of germanium. The thin dielectric film must be deposited on a substrate of substantially greater thickness than the film, where the substrate is comprised of a material which is transparent over the spectral bandwidth of interest. In the case of the mid-infrared regions, potassium bromide (KBr) is a good choice for the substrate. A typical Michelson interferometer 20 constructed in this fashion is shown in simplified schematic diagram form in FIG. 3, where elements common to the spectrometer shown in FIG. 1 have been assigned the same identifying number. The difference between the interferometer 20 of FIG. 3 and interferometer 10 of FIG. 1 is the inclusion of substrate 28 in the former to support the thin film beamsplitter 14.

This modification does not affect the reflected beam path, as the previously discussed equations for the reflected beam path in the interferometer 10 of FIG. 1 still apply. The beam traversing the transmitted path $E_{tr}$ is, however, affected by the addition of substrate 28 to interferometer 20 shown in FIG. 3. The beam is refracted according to Snell's Law which bends the path. However, the effect is cancelled upon refraction at the beam exit surface of substrate 28. Beam refraction upon reentering substrate 28 following reflection by the scanning retroreflector 22 brings the transmitted beam $E_{tr}$ to the proper point for recombination just as in the case of the interferometer 10 of FIG. 1. The recombined output beam $E_{out}$ also undergoes refraction upon exit toward detector 26, however, the optical interactions of the recombined beam are not relevant to the derivation of the interferometric principles discussed herein and will therefore be ignored. The interactions of interest are the interactions of the electromagnetic radiation with the substrate 28 along the transmitted interferometer arm $E_{tr}$.

The effect of substrate 28 is to increase the optical distance traversed by the transmitted beam $E_{tr}$. The increased distance is defined as $z_{str}$, which is a positive number and is given by the following expression:

$$Z_{str} = Z_{tr} + Z_s \quad (5)$$

The added path length of the transmitted beam $E_{tr}$ arises from two effects of transmission of an electromagnetic wave through a medium. First, Snell's Law predicts that the beam path will be bent upon refraction which increases the path slightly. Assuming a given fixed angle of incidence, such as the 45° for the case of interferometer 20 shown in FIG. 3, the angle of refraction can be computed. Where the medium is air having an index of refraction n of 1, the calculation is simplified and is given by the following expression $$\cos(\Theta_2) = \frac{l_s}{d} \quad [Eq. 6]$$

With the angle of refraction $\theta_2$ and the thickness d of the substrate known, the physical path travelled by the transmitted beam in the substrate $l_s$ can be calculated from Equation 6.

The other distance of interest is the distance replaced by traversal of the substrate $l_0$ which will be required to compute the increase in distance caused by insertion of the substrate in the interferometer. This distance $l_0$ is calculated using the geometry details shown in FIG. 4 using the following equation.

$$l_0 = d\cos(\theta_1 - \theta_2)\cos(\theta_2) \quad (7)$$

The second effect on the change in distance traversed by the transmitted beam $E_{tr}$ arises from the physics of propagation of an electromagnetic wave through a medium. The medium has the effect of slowing the speed of propagation of the wave to a value less than that of the speed of light in a vacuum. The index of refraction n is the key variable describing the effect. The index of refraction n is defined as the ratio of the speed v of propagation in a medium relative to the speed of light c in a vacuum. Continuity of field values at the interface of the two media ensures that the frequency of the waves is the same in both media. The net increase of optical effective distance propagated by an electromagnetic wave in a medium is given by $$\sigma_2 = n_2 \sigma_1 \quad (8)$$

Thus, the distance traversed along an optical path is increased in proportion to the index of refraction of the medium through which the electromagnetic wave travels.

The optical distance $z_{so}$ added by the incorporation of substrate 28 in interferometer 20 is given in terms of wavelengths in the medium by the following $$z_{so} = l_s \frac{\sigma_2}{\sigma_1} \quad [Eq. 9]$$

The increased optical distance may be expressed in terms of the index of refraction $n_2$ of the medium, the thickness d of the medium, and the angle of refraction $\theta_2$, taking into consideration the two traversals in the model interferometer, as follows $$z_s = 2n_2 d\cos(\theta_2) - 2d\cos(-\theta_2 + \theta_1)\cos(\theta_2) \quad (10)$$

This increase in optical distance adds one term to the primary interferometer equation derived for a simple interferometer model as expressed in Eq. 4. It can be shown that the substrate introduces an effective distance term to the angle of the cosine that describes the interferogram function that is measured by the square law detector. This added term is a function of the index of refraction of the substrate and is given by the following $$P_{DS} = P_{DS}\cos(2\pi\sigma[x - z_s]) \quad (11)$$

FIG. 5 shows an interferogram for an interferometer with a substrate. A comparison of FIG. 5 with FIG. 2 shows that the effect of the substrate is to shift the phase of the cosine waveform by the distance added by the substrate (0.00010154 cm for the illustrated example). It should be noted that the amplitude and frequency of the electromagnetic wave have not been affected. In reality, the amplitude is affected by reflection and refraction losses, however, these phenomena are not crucial to the present considerations. The actual phase shift from a typical substrate having a thickness on the order of 0.5 cm is much larger (5,000 times larger) over many full cycles of the waveform (approximately 507 cycles in the illustrated example).

Thus far only monochromatic electromagnetic radiation has been considered. Practical use of interferometers employs broadband radiation having wavelengths extending over a finite range of wavenumber values. The superposition principle of electromagnetic waves provides that each wavelength may be analyzed individually and the results summed to predict the resulting waveform present at the detector during a scan (interferogram). This means that the results for the models thus far analyzed are valid and a direct integration over the bandwidth of interest may be performed by replacing the power terms with appropriate power density functions of wavenumber.

Summing (or integrating) over the bandwidth of interest is given by the following equation $$I(x) = \int_{\sigma_1}^{\sigma_2} S(\sigma)\cos(2\pi\sigma[x - z_s])d\sigma \quad [Eq. 12]$$

The power at the detector is replaced by the interferogram function I(x) which is the detector response as a function of retardation generated by scanning the moving retroreflector. The incident wave's power at a specific wavenumber has been replaced by a spectrum function S (wavenumber) which is the power per wavenumber over an infinitesimally small wavenumber interval.

The object of interferometric spectroscopy is to determine the spectrum by measuring the interferogram which is defined by Eq. 12. Well known methods are available for calculating the spectrum from the measured interferogram for the case of broadband radiation with no substrate present. These techniques make use of the relationships between Fourier-transform pairs to determine the spectrum, with Eq. 12 expressing the interferogram function I(x) in the form of a cosine Fourier-transform pair. If an ideal interferometer (without substrate) is used to measure the interferogram, a cosine Fourier-transform is all that is required to calculate the desired spectrum as set forth in Eq. 13.

$$S(\sigma) = \frac{1}{2\pi}\left(\int_{\sigma_1}^{\sigma_2} I[x]\cos[2\pi\sigma x]d\sigma\right) \quad [Eq. 13]$$

When the effects of the substrate are taken into account, the simple cosine integral has an additional phase term $Z_s\sigma$ as set forth in the following $$Z_s = n_s d\cos(\theta_2) - d\cos(\theta_1 - \theta_2)\cos(\theta_2) \quad (14)$$

The phase shift is a function of wavenumber θ and thus depends upon the index of refraction of the substrate material. However, the index of refraction is not constant over the spectral range of interest as shown in FIG. 6 which is a graphic representation of the variation of index of refraction of potassium bromide (KBr) over the spectral range of interest (400 to 4,000 cm$^{-1}$).

If the index of refraction were constant over the spectral range of interest, the linear term in the phase shift could be easily corrected by a mere shift of the X-axis in FIG. 5. Eq. 14 indicates that $z_s$ would be constant (n being constant), hence the term "x−$z_s$" could be simplified by defining a new independent variable as y=(x−$z_s$). The simple cosine Fourier analysis would again be sufficient to determine the desired spectrum. The physical interpretation of this axes shift is simply that the point of zero path difference (ZPD) of the interferogram scan is simply shifted by the length of the optical path added to the substrate ($z_s$).

The additional phase term that depends on wavenumber complicates the Fourier analysis. However, with proper care the spectrum may be reliably determined. The solution uses the identity that allows the cosine of the sum of two angles to be expanded as shown in Eq. 15. The expanded form of the cosine term can be used to express the interferogram as two separate sine and cosine integrals as set forth in Eq. 16. The sine and cosine forms indicate that a complex Fourier analysis will be needed to obtain the desired spectrum from the interferogram.

$$\cos(2\pi x\sigma - \phi[\sigma]) = \cos(\phi[\sigma])\cos(2\pi x\sigma) + \sin(\phi[\sigma])\sin(2\pi x\sigma) \quad [Eq.\ 15]$$

$$I(x) = \left( \int_{\sigma_1}^{\sigma_2} S[\sigma][\cos(\phi(\sigma))\cos(2\pi x\sigma)]d\sigma \right) + \left( \int_{\sigma_1}^{\sigma_2} S[\sigma][\sin(\phi(\sigma))\sin(2\pi x\sigma)]d\sigma \right) \quad [Eq.\ 16]$$

To solve the problem, the interferogram must be divided into two components, a symmetric component $I_s$ and an asymmetric component $I_A$. From the form of the integrals and their dependence on x, we can see that the first term in Eq. 16 is symmetric with respect to x and that the second integral is asymmetric with respect to x. This allows Eq. 16 to be rewritten as two separate equations, where the Fourier-transform pair can be identified by treating the spectrum multiplied by the phase component as a single spectral function to be Fourier analyzed. In this manner, the cosine Fourier-transform of the symmetric portion of the interferogram and the sine Fourier-transform of the asymmetric portion of the interferogram can be calculated respectively by the following two equations $$S(\sigma)\cos(\phi[\sigma]) = \int_{x_1}^{x_2} I_s(x)\cos(2\pi\sigma x)dx \quad [Eq.\ 17]$$

$$S(\sigma)\sin(\phi[\sigma]) = \int_{x_1}^{x_2} I_a(x)\sin(2\pi\sigma x)dx \quad [Eq.\ 18]$$

For simplicity, the sign and ½ π factors that enter into the inverse Fourier-transform expressions have been omitted.

Eqs. 17 and 18 are nearly in a form to provide the desired spectrum as a well defined calculation based upon the measured interferogram. However, there are significant practical problems associated with the desired solution. One is associated with the matter of determining the symmetric and asymmetric portions of the interferogram related to the problem of precisely determining the point where the retardation is zero. The second problem is associated with determining the phase term to sufficient accuracy. These two problems are related in that if there is no phase term, the zero path difference (ZPD) could easily be determined by finding a simple maxima of the interferogram function. However, the phase term is a very large number, typically several hundreds or even thousands of cycles (6.28 radians per cycle), which becomes significant when considering that even a small fraction of a cycle (0.1 radian) phase shift can introduce spectral errors as large as 100%.

The necessity of the substrate and the interference of the resulting phase shift has plagued interferometers from their initial designs. A solution to this problem taken by Michelson involved the introduction of an optical compensating element in the opposing arm of the interferometer, or in the path that does not go through the substrate. A conventional interferometer with a compensator 30 is shown schematically in FIG. 7. Compensator 30 is an optical element identical to the substrate 28, comprised of the same material and having the same thickness. The positioning of the compensator 30 requires the reflected beam $E_{rf}$ to undergo the same refraction and dispersion present in the transmitted beam $E_{tr}$. This optical solution was used for interferometric applications from the time of the invention of the Michelson interferometer until 1969. The limitation of this approach involving the impossibility of matching the thickness and optical properties of the substrate and compensator to completely correct the dispersion of the substrate limited the accuracy of the measured results. This approach also suffered from other small phase error terms that arise from the electronics used to process the interferogram waveform, the detector's frequency response characteristics, the discrete sampling techniques (analogue-to-digital conversion), as well as the residual phase imbalance between the compensator and substrate.

The present invention addresses the aforementioned limitations of the prior art by eliminating the compensator in a Michelson interferometer and avoiding the considerations and complexity associated therewith. By eliminating the interferometer compensator, reflection and beamsplitter edge losses are reduced, interferometer signal dynamic range is limited for reduced signal processing requirements, precise interferometer alignment and dimensional criteria may be relaxed, and interferometer cost is reduced by the reduced number of components and complexity.

OBJECTS AND SUMMARY OF THE INVENTION

Accordingly, it is an object of the present invention to provide an improved Michelson interferometer of reduced cost and complexity.

It is another object of the present invention to provide a dual beam interferometer without optical path compensation between the reflected and transmitted beams.

Yet another object of the present invention is to provide a novel signal processing method which affords a high signal-to-noise ratio for use generally in infrared Fourier transform spectroscopy and in particular with a dual beam interferometer such as employed in a spectrometer.

A further object of the present invention is to provide a high degree of optical signal sensitivity over a wide dynamic signal range in a dual beam interferometer by means of a novel Fourier transform method.

A still further object of the present invention is to substantially eliminate optical beam phase errors in an interferometer for providing a more accurate interferogram.

These objects of the present invention are achieved and the disadvantages of the prior art are eliminated by a Fourier transform infrared (IR) spectrometer wherein an IR beam is directed onto a sample for providing either a reflectance or absorbance spectrum of the sample. The spectrometer includes a beamsplitter responsive to an input IR beam incident thereon for substantially equally dividing the input IR beam into a first reflected beam portion and a second transmitted beam portion. The first reflected beam portion is directed onto a first reflector which reflects the first beam portion back onto the beamsplitter, with the first beam portion then partially transmitted by the beamsplitter. The beamsplitter is affixed to a substrate for support and stable positioning of the beamsplitter, with the input IR beam directed through the substrate and onto the beamsplitter. The spectrometer further includes a second reflector aligned with the second transmitted beam portion for directing the second transmitted beam portion back onto the beamsplitter, wherein the second transmitted beam portion is partially reflected and partially transmitted by the beamsplitter. After partial reflection and transmission by the beamsplitter, the first and second beam portions are combined to form an output IR beam which is uncompensated due to a difference in optical paths travelled by the first and second beam portions. A translation arrangement is coupled to one of the first or second reflectors for moving one of these reflectors for providing an uncompensated output IR beam with an interference pattern, wherein the uncompensated output IR beam is directed onto said sample for obtaining a spectrum of the sample. The spectrometer further includes a detector and a signal processing arrangement responsive to the uncompensated sample interferogram produced when the uncompensated output IR beam interacts with the sample for determining a corrected phase angle in terms of wavenumber arising from the substrate's optical thickness to provide for a complex intermediate spectrum of a Fourier-transform of the uncompensated interferogram. The signal processing arrangement than rotates the complex intermediate spectrum by a negative of the corrected phase angle to provide a corrected real compensated intermediate interferogram which is then Fourier-transformed to provide a compensated interferogram with asymmetric noise and small phase errors removed.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
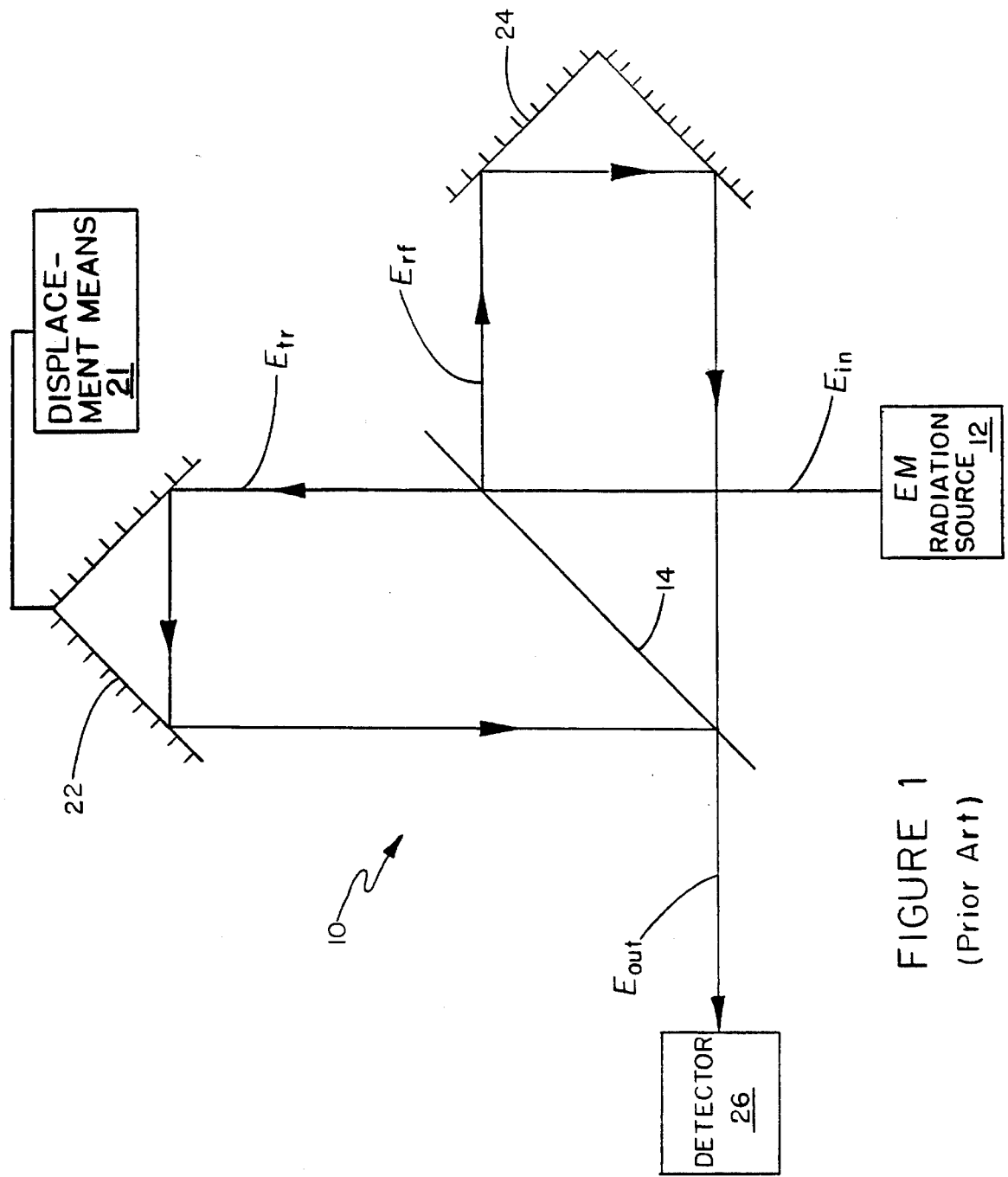
FIG. 1 is a simplified schematic diagram of a simple interferometer with a freestanding beamsplitter.
Figure 2:
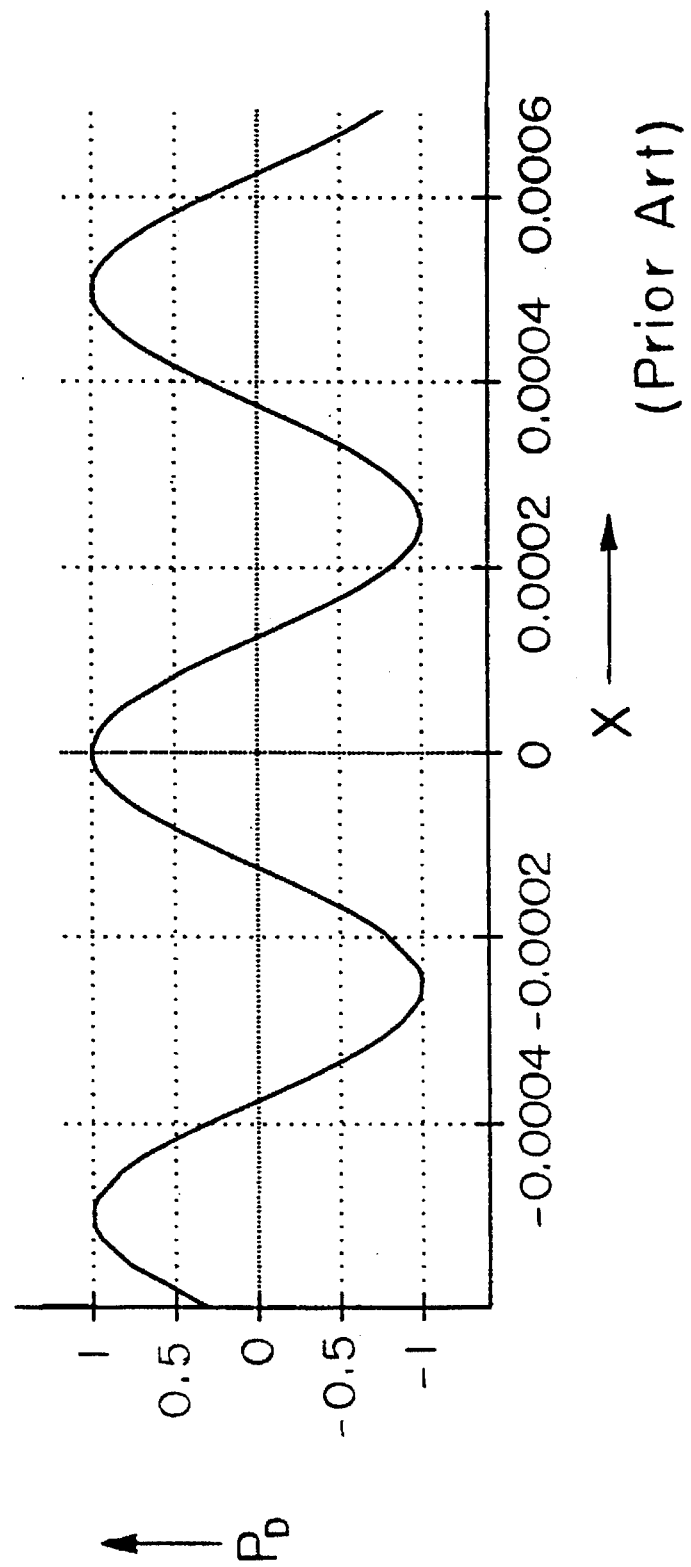
FIG. 2 is a graphic representation of the variation of detected power $P_D$ of an interferometer exit beam as a function of retardation of x the interferometer's scanning retroreflector.
Figure 3:
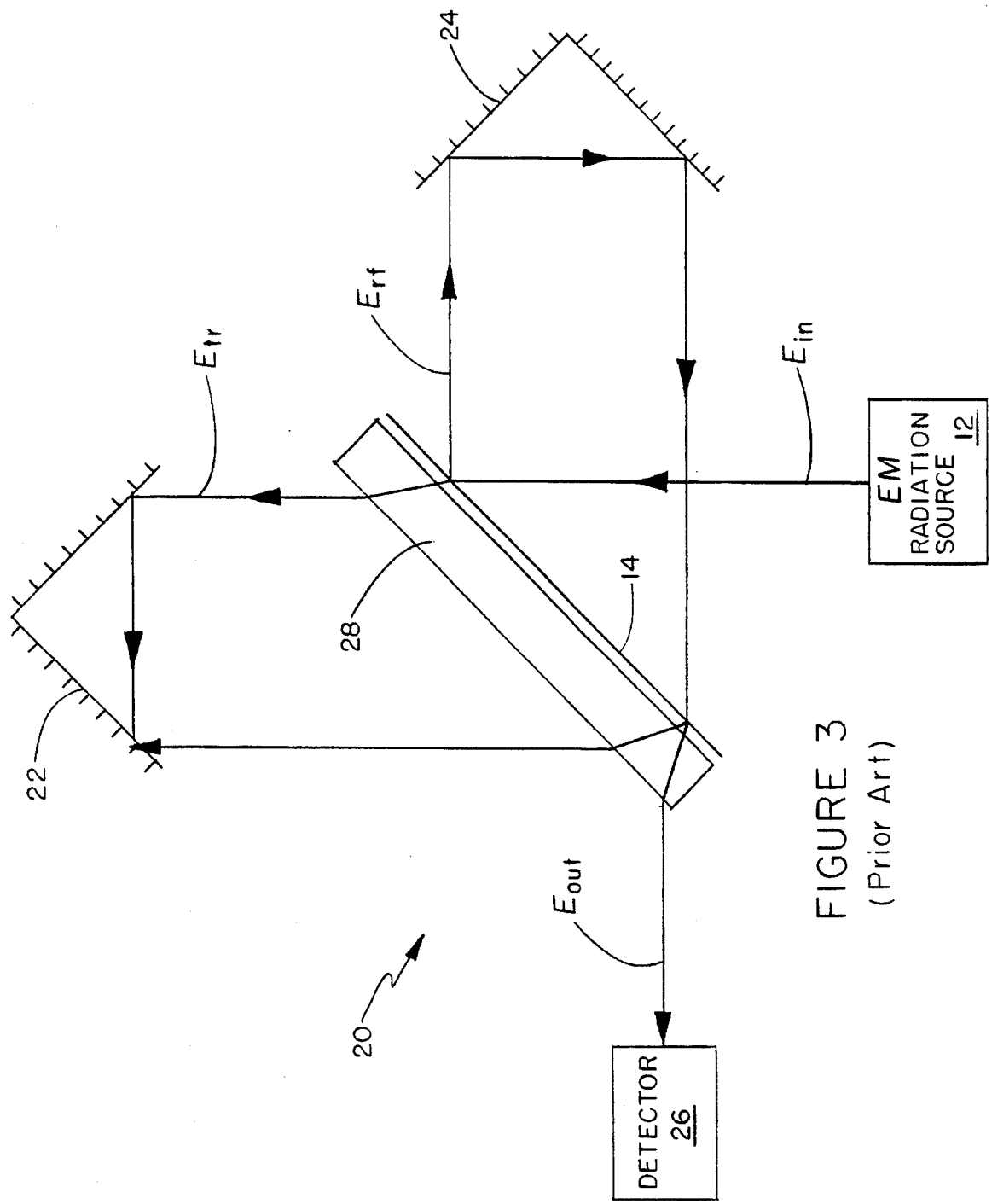
FIG. 3 is a simplified schematic representation of a prior art interferometer with a thin film beamsplitter supported on a substrate of substantial thickness.
Figure 4:
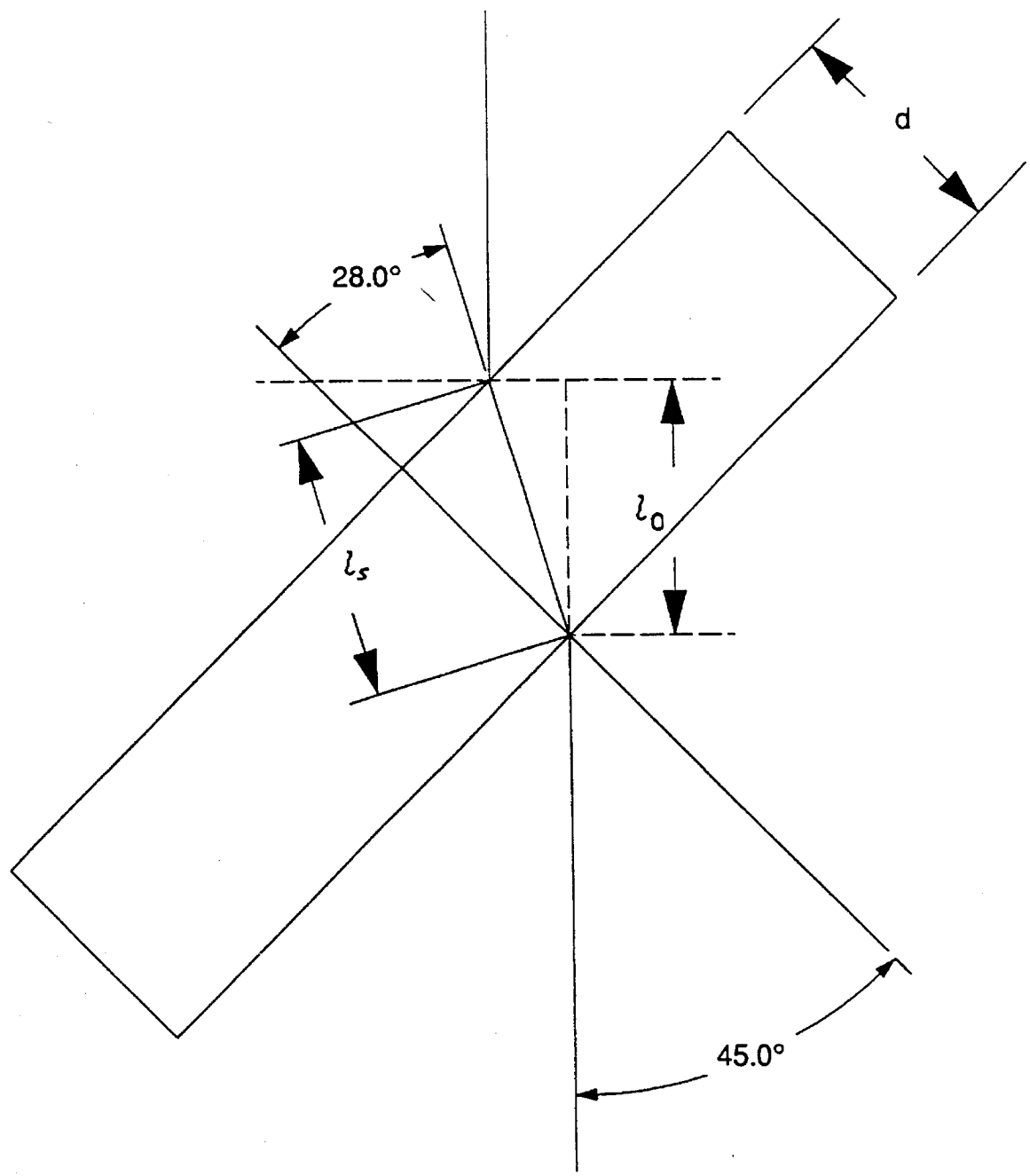
FIG. 4 is a simplified schematic diagram of a geometry detail for a transmitted beam as reflected by the substrate material.
Figure 5:
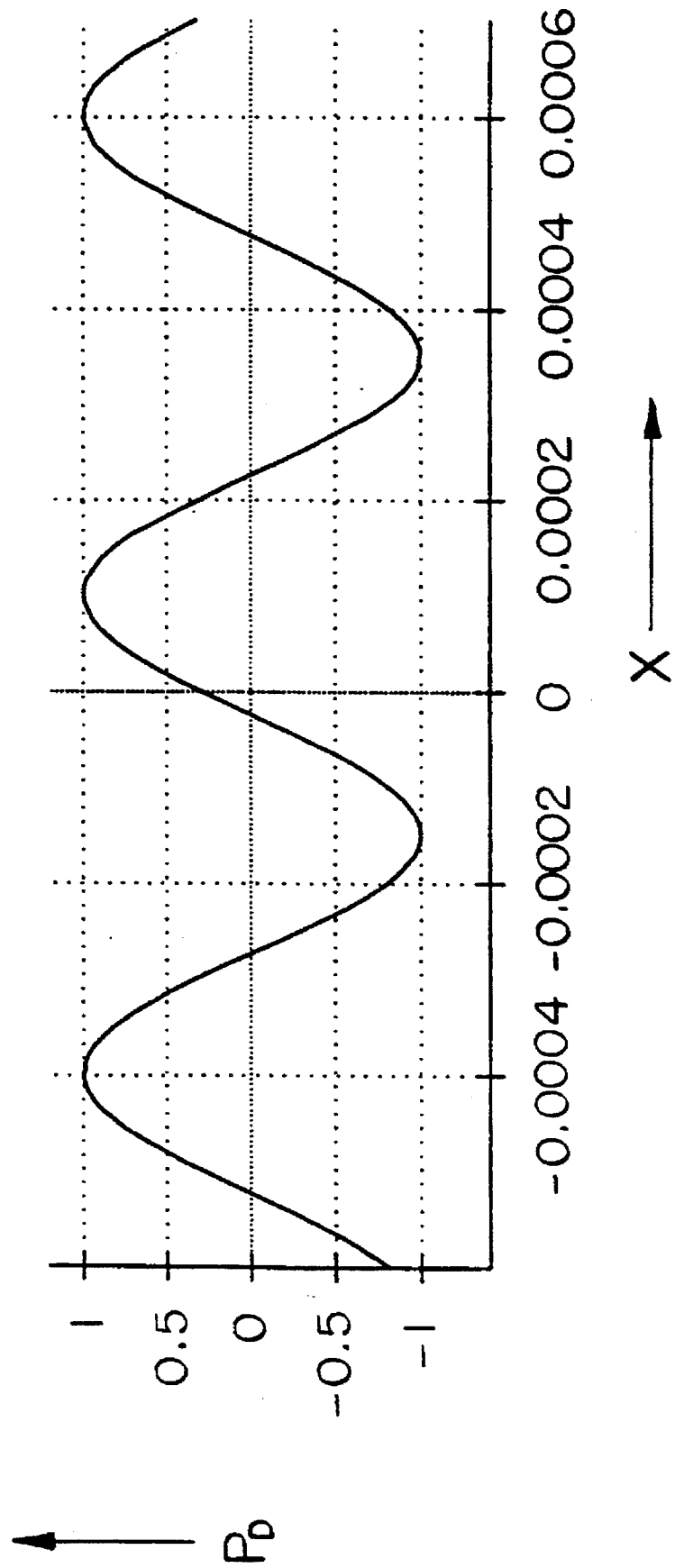
FIG. 5 is a graphic representation of the variation of detected power $P_D$ of an interferometer exit beam as a function of retardation x (interferogram) for an interferometer with a substrate, where the substrate thickness has a value smaller than practical to demonstrate the phase shift effect of the additional path length term.

The simplest approach to obtaining the desired spectrum in the presence of small phase errors that arise from the electronics used to process the interferogram waveform, the detector's frequency response characteristics, the discrete sampling techniques (analog-to-digital conversion), as well as the residual phase imbalance between the compensator and substrate uses the power spectrum as an approximation to the desired spectrum. The following two equations $$S_{Re}(\sigma) = \int_{x_1}^{x_2} I(x)\cos(2\pi\sigma x)dx \quad [Eq.\ 19]$$

$$S_{Im}(\sigma) = \int_{x_1}^{x_2} I(x)\sin(2\pi\sigma x)dx \quad [Eq.\ 20]$$

cannot be compared directly to the solution Eqs. 18 and 19 because the full interferogram is not separated into the symmetric and asymmetric components. The real and imaginary terms can be expanded to show the contribution from the symmetric and asymmetric contribution and are respectively shown in the following two equations $$S_{Re}(\sigma) = \int_{-x_0}^{x_0} (I_s[x]\cos[2\pi\sigma x])dx \quad [Eq.\ 21]$$

$$S_{Im}(\sigma) = \int_{-x_0}^{x_0} I_a(x)\sin(2\pi\sigma x)dx \quad [Eq.\ 22]$$

If the range of integration is symmetric over x, then the asymmetric cosine term will drop out of the sum of the real component and the symmetric sine term will cancel from the imaginary portion. This experimental approach thus requires that the interferogram be scanned symmetrically about the point of zero retardation (x=0). A comparison of Eqs. 21 and 22 with Eqs. 17 and 18 can be used to identify the physical meaning of the results of the complex Fourier-transform, leading to the following two expressions $$S(\sigma)\cos(\phi[\sigma]) = \int_{x_1}^{x_2} I_s(x)\cos(2\pi\sigma x)dx \quad [\text{Eq. 23}]$$

$$S(\sigma)\sin(\phi[\sigma]) = \int_{x_1}^{x_2} I_a(x)\sin(2\pi\sigma x)dx \quad [\text{Eq. 24}]$$

Squaring these two equations and adding leads to the elimination of the phase term as shown by the following $$S(\sigma) = \sqrt{(S_{Re}[\sigma])^2 + (S_{Re}[\sigma])^2} \quad [\text{Eq. 25}]$$

Eq. 25 expresses the spectrum as an approximation in terms of the square root of the sum of the squares of the real and imaginary terms of the Fourier-transform.

There are significant limitations in the power spectrum approach to deriving the interferogram waveform. The most significant limitation arises when noise is considered. Random noise is always present in practical implementations of the interferometric measurement of the interferogram. If random noise is considered, the cancellation of terms in Eqs. 21 and 22 is not correct. The easiest way to see the effect of this approximation is by examining the noise properties of the resulting Eq. 25. It is clear that all spectral values will be positive, with no negative numbers arising from the computation of the spectrum of this algorithm. This is a significant limitation when attempting to obtain accurate spectral measurements and is particularly noticeable when measuring strong absorbance bands that should be measured as zero energy reaching the detector. In addition, the power spectrum increases the amount of noise by rectifying the noise that results from the sine and cosine transform. Any slight errors in the determination of the point of zero retardation will make the integrals of Eqs. 21 and 22 significantly asymmetric, introducing further errors to the resulting spectral approximation. In general, the power spectrum method is not accurate enough to be used in state of the art spectroscopic measurements with the interferometer.

In 1969, Dr. Larry Mertz developed an improved technique for correcting for these minor phase terms present in an optically compensated interferometer. The method has been used extensively since its inception and is known as the Mertz phase correction. This technique is an approximation that allows the solution of Eqs. 17 and 18 for the spectrum $S(\sigma)$. This technique does not require the interferogram to be sampled symmetrically, but does require a reasonable estimate of the point of zero path difference (x=0). The data analysis technique employing the Mertz phase correction employs a complex Fourier analysis, with the real portion of the result providing the cosine transform term of Eq. 17 and the imaginary portion the sine transform term of Eq. 18. These calculations are easily made to the measured raw interferogram. However, Eqs. 19 and 20 cannot be compared directly to the solution Eqs. 17 and 18 because the full interferogram is not separated into the symmetric and asymmetric components.

Figure 8A:
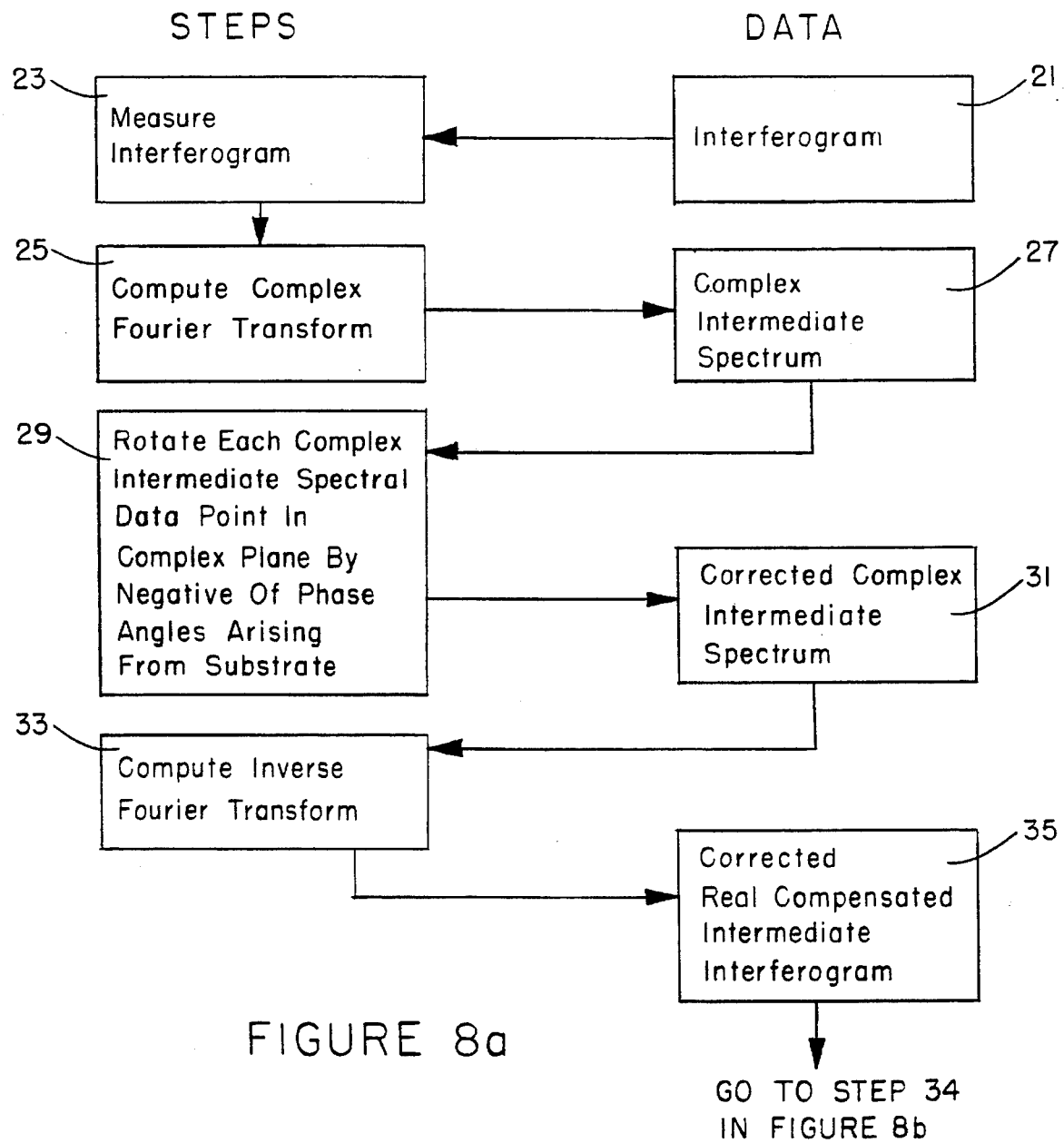
FIGS. 8a and 8b are flow diagrams illustrating the sequence of steps involved in carrying out the spectroscopic method of the present invention.
Figure 8B:
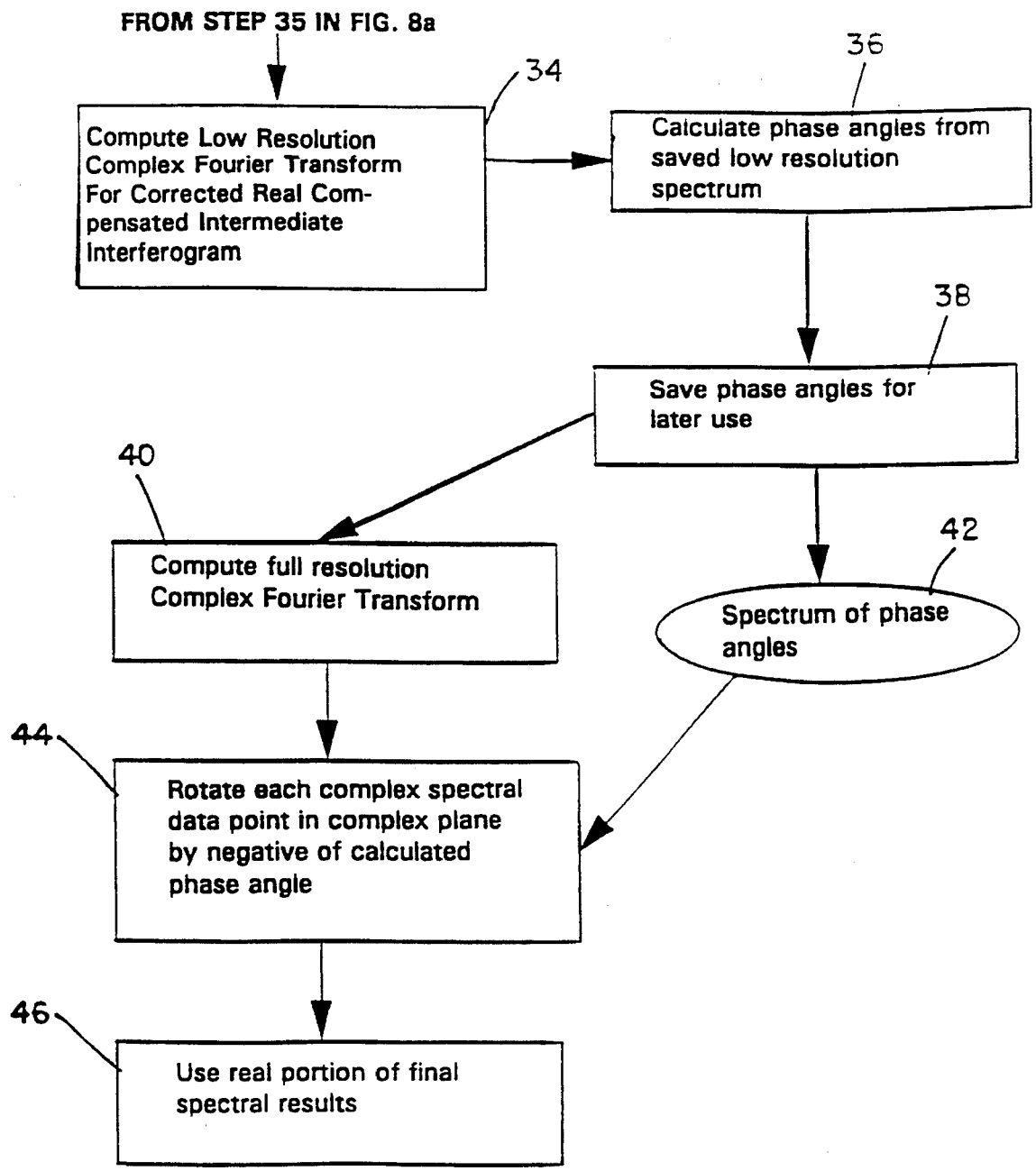

Referring to FIGS. 8a and 8b, there is shown a flow diagram outlining the steps of a method in accordance with the present invention. FIG. 8a is a flow diagram illustrating the series of steps involved in providing a corrected real compensated intermediate interferogram which is processed by the series of steps shown in FIG. 8b in accordance with the aforementioned Mertz approach. In FIG. 8a, the method steps are briefly summarized in the left-hand column, while the starting and calculated data are briefly summarized in the right-hand column.

The inventive method is initiated at step 23 with the measuring of an interferogram 21 of a sample. A complex Fourier transform of the measured interferogram is then computed at step 25 to provide a complex intermediate spectrum of the sample at step 27. Eq. 39 described below is used in computing the complex Fourier transform. Each complex intermediate spectral data point in the complex plane is then rotated by the negative of the phase angles arising from the substrate supporting the sample at step 29 using Eq. 40 described below. This provides a corrected complex intermediate spectrum 31 for which an inverse Fourier transform is computed at step 33. Computing the inverse Fourier transform of the corrected complex intermediate spectrum provides a corrected real compensated intermediate interferogram at step 35. Eq. 41 described below is used in computing the inverse Fourier transform. The corrected real compensated intermediate interferogram is then processed in accordance with the Mertz approach as shown in FIG. 8b and as described in the following paragraph.

The Mertz approach shown in FIG. 8b uses an approximation to determine experimentally the values for the phase angle term $\phi$ as a function of wavenumber ($\sigma$). The Mertz phase correction method employs Eq. 42 described below to correct for phase errors and to separate the asymmetric noise term from the resulting spectrum. The approximation relies on the fact that by using optical compensation, the rate of change of phase angle $\phi$ with respect to wavenumber $\sigma$ is slow. A flow diagram outlining the method of the steps taken in the Mertz approach is shown in FIG. 8b. The method is initiated at Step 34 by computing a low resolution complex Fourier transform for the corrected real compensated intermediate interferogram of Step 35. The phase angles are then calculated from the low resolution spectrum at Step 36, with the thus calculated phase angles stored for later use at Step 38. The Mertz approach then involves computing the full resolution complex Fourier-transform at Step 40. Each complex spectral data point is then rotated in the complex plane by the negative of the calculated phase angle at Step 44, where the full spectrum of phase angles is provided at Step 42. The real portion of the results of Step 46 is the desired spectrum corrected for the absence of the interferometer's compensator. The approximate values for the phase angles are calculated at Step 36 using Fourier analysis of a small region of the interferogram. The small interferogram is extracted from the full interferogram from a range symmetric to the estimated point of zero retardation. The point of zero retardation is determined by examining for a maximum of the interferogram and using that point in the data array as the zero path difference point.

Figure 9:
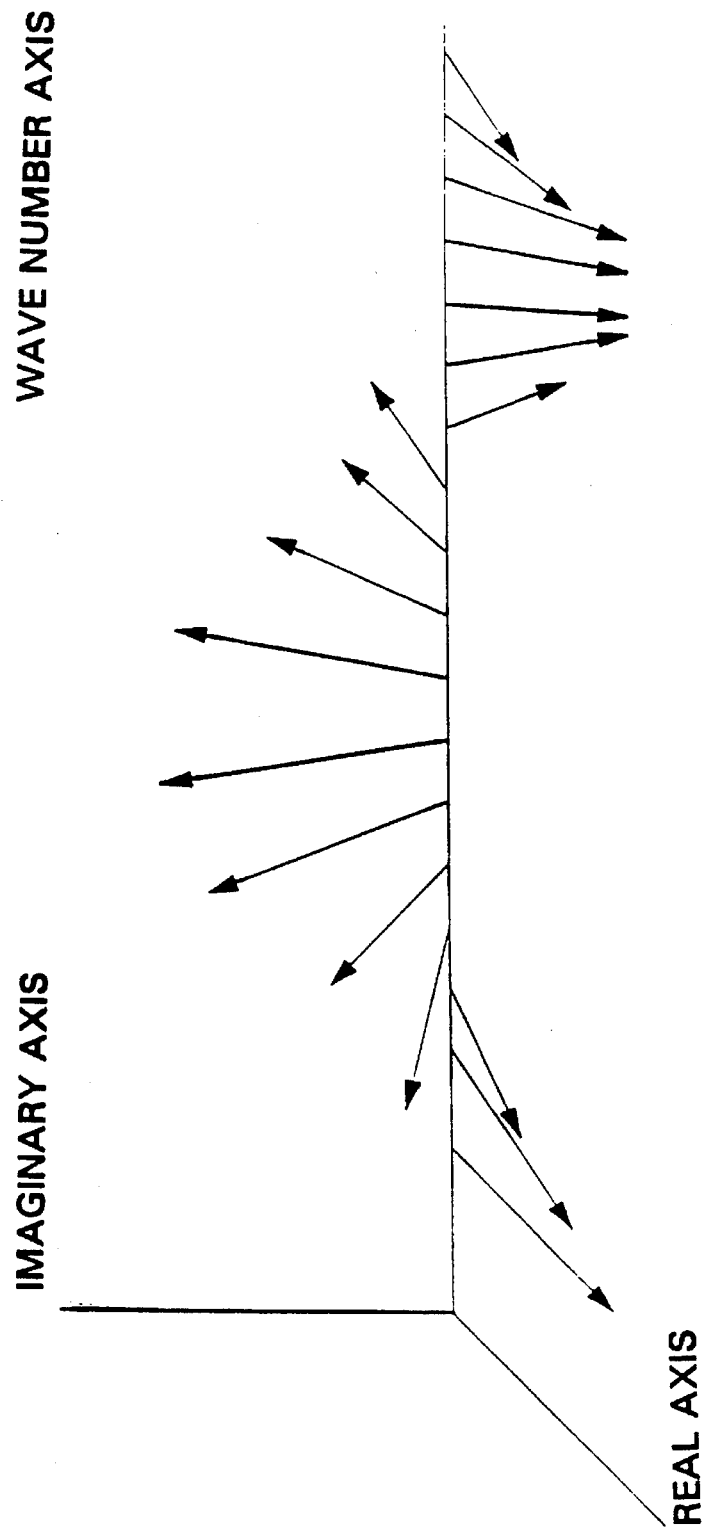
FIG. 9 is a schematic illustration of the variation of phase angle over the spectrum in the complex plane.
Figure 10:
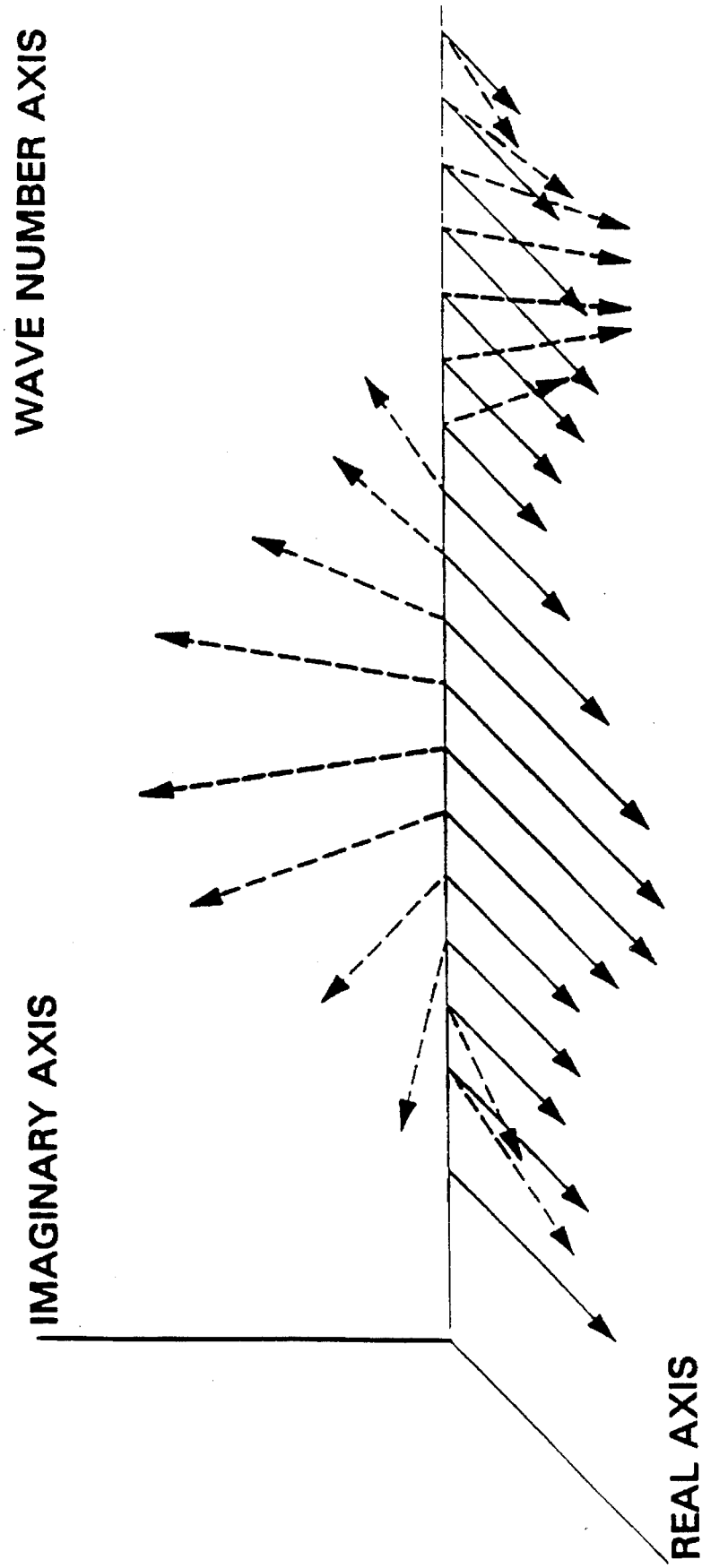
FIG. 10 is a schematic illustration of the phase correction by rotating the spectral vectors onto the real plane.

Referring to FIG. 9, there is shown in graphic form an example of the complex spectrum from the low resolution Fourier-transform. From FIG. 9, it can be seen that the vector lengths are the desired spectrum amplitude and the vector angles (projected onto the complex plane) are an approximation for the phase angles of Eqs. 23 and 24. The Mertz phase correction approach uses this approximate angle function to rotate each complex spectral vector onto the plane containing the real axis at each wavenumber. This step is shown graphically in FIG. 10, where each vector (complex spectral data point) is rotated onto the real plane by the phase angle calculated from the low resolution Fourier analysis.

Figure 7:
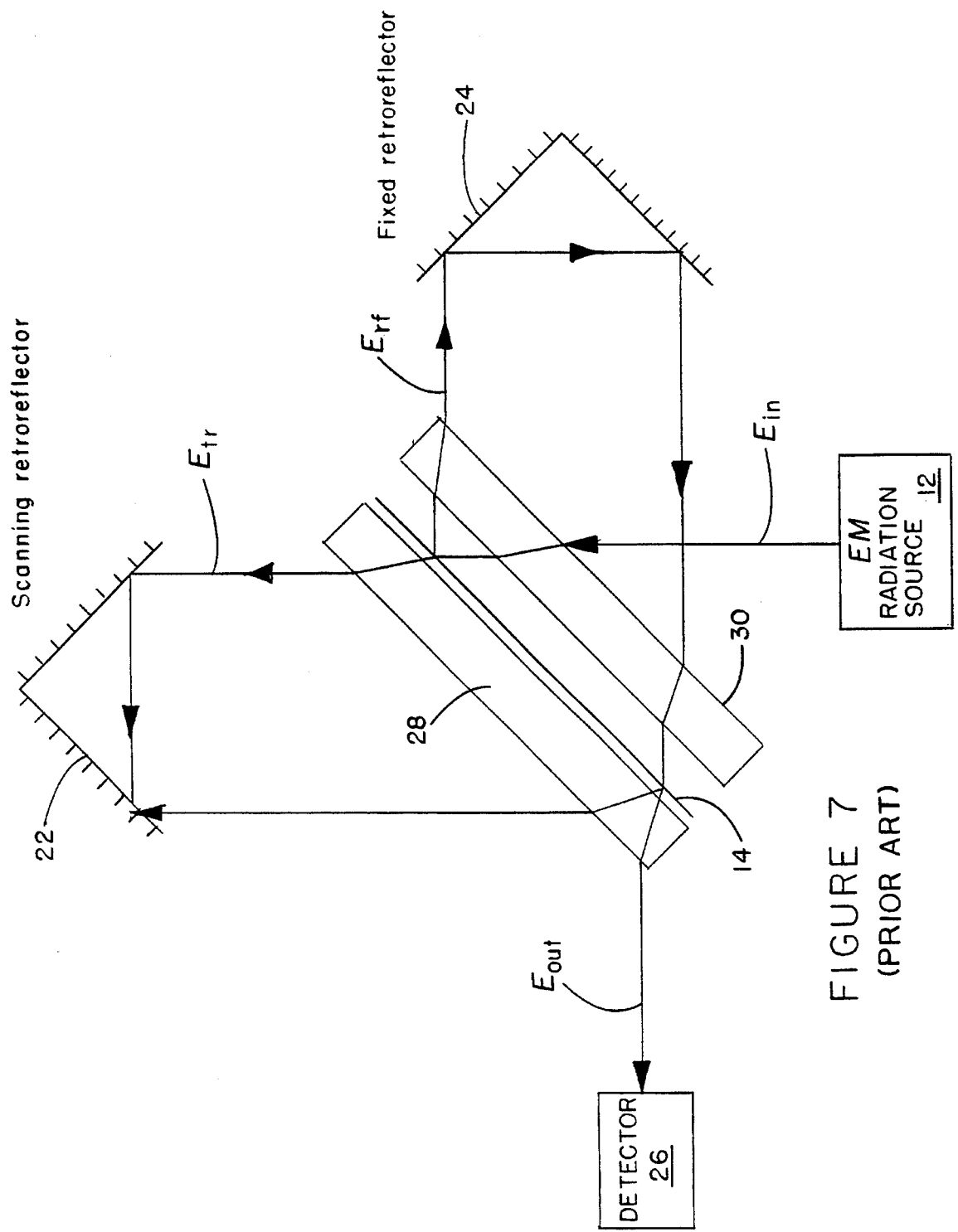
FIG. 7 is a simplified schematic diagram of a prior art optically compensated interferometer.

The approach of using the matched optical compensator in conjunction with the Mertz phase correction method is the current state of the art of data analysis in interferometric spectroscopy. This approach, however, has several limitations. For example, the compensator cannot be matched closely enough to the substrate and additional manufacturing costs are incurred in attempting to achieve this match. Even with careful control of component specifications and measurements and specific matching of substrate and compensator thickness, an optically significant mismatch typically results. The amount of phase shift (several thousands of wavelengths) is so large and the requirement for a match (to within a fraction of a wavelength) is so precise that exact compensation is not possible. In addition, energy is lost at the optical interfaces of the compensator. For example, the entrance beam $E_{in}$ must refract into and out of the compensator 30 before it reaches the beamsplitter 14 as shown in FIG. 7. Also, the reflected beam $E_{rf}$ must pass through the compensator 30 twice before returning to the beamsplitter 14 to be recombined with the transmitted beam $E_{tr}$. Each time the electromagnetic radiation traverses into or exits the compensator, energy losses occur. For materials of high refractive index, such as are typical for the construction of beamsplitter substrates, these losses can be significant. Any loss of energy in the spectroscopic measurement is undesirable, as this results in a reduction in the signal-to-noise ratio of the measured interferogram waveform.

There are several advantages to the measurement if the optical compensator is not used and the method shown in the flow chart of FIGS. 8a and 8b is employed. For example, the requirement for high optical tolerances when constructing the beamsplitter substrate and compensator can lead to significant costs for these elements of a commercial spectrometer. The matching needs of the experiment require the compensator to be constructed to the same optical tolerances as the substrate, e.g., flatness, surface quality, etc. The materials used are often exotic in nature and expensive to purchase. Therefore, an interferometer constructed without the compensator would necessarily be less expensive to build and more energy efficient.

Figure 11:
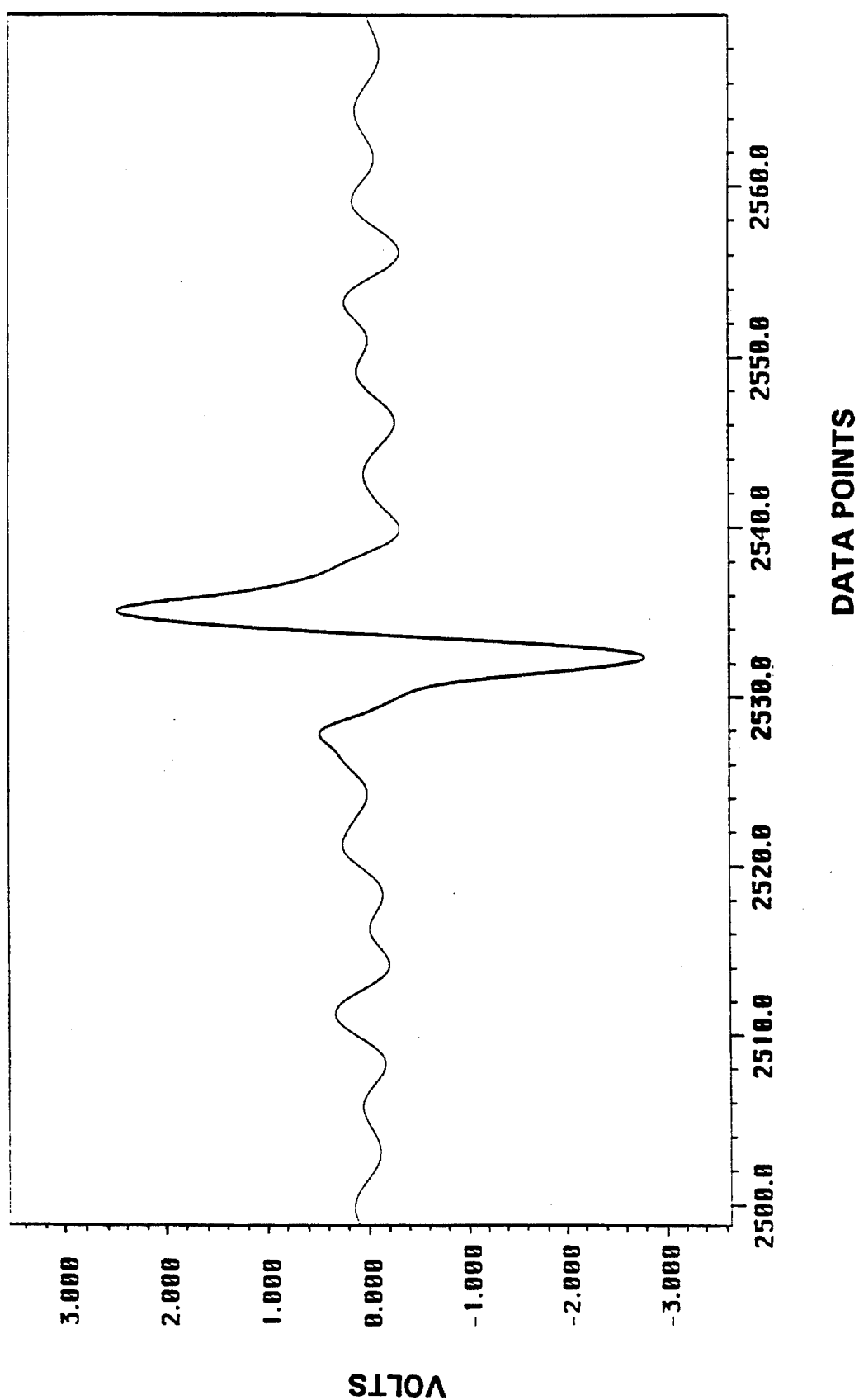
FIG. 11 shows a normal optically compensated interferogram waveform.
Figure 12:
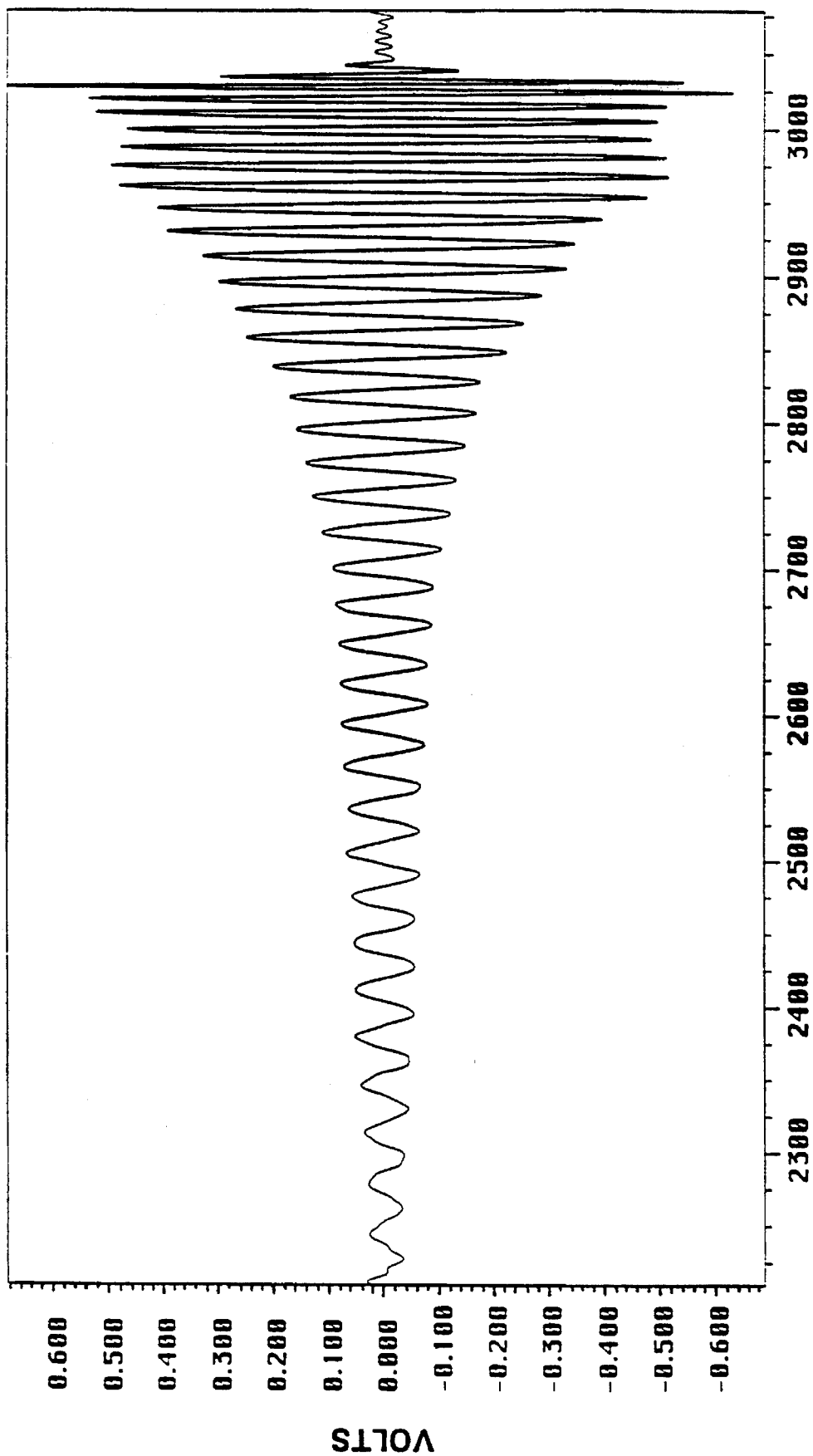
FIG. 12 illustrates a typical interferogram from a non-optically compensated interferometer in accordance with the principles of the present invention.

One of the primary limitations present in current interferometric spectrometers is the dynamic range available in electronic signal processing and the analog-to-digital signal conversion. The compensator eliminates most of the phase dispersion providing a unique zero retardation point for all wavelengths present. This leads to an interferogram waveform such as shown in FIG. 11 that exhibits a large central peak flanked by extremely small fluctuations. To accurately measure the interferogram, analog electronics and analog-to-digital converters with high dynamic range capabilities must be employed. The current state of the art for interferometric spectrometry employs 18 bit ADC converters with Dolby line noise reduction and dynamic range extension techniques. Even with these methods employed, many experiments are apparently limited by system dynamic range. If an optical compensator is not used, the large central peak of the interferogram is dispersed. Since the uncompensated measurement does not have one unique point of zero retardation for all wavelengths, there is not one single point in the interferogram scan where all cosine waves for the individual wavelengths come into phase. A typical interferogram from a non-optically compensated interferometer is shown in FIG. 12. The end result is a substantial reduction in the dynamic range needed to accurately measure the small fluctuations of the interferogram in the presence of the larger central excursions. Alternatively, the same high dynamic range signal processing electronics may be used to improve the end results when compared to an optically compensated measurement.

Another limitation of the use of an optical compensator involves the degree of linearity obtainable from many of the most sensitive detectors available for measurement of the interferogram waveform. Many of the detectors, such as those of mercury cadmium telluride (MCT), are only approximately linear over a limited range of incident power values. When these are used to measure the large peak of the interferogram, errors result which limit the photometric accuracy of the resulting spectrum. The distributed, smaller peaks of the interferogram of FIG. 12 may be more accurately measured since the detector's range of operation is smaller.

The above discussion covers some of the advantages realized with the elimination of the optical compensator in a Michelson interferometer. The present invention employs a more precise approach to determine the true spectrum $S(\sigma)$ from the complex Fourier analysis of the interferogram of an uncompensated interferometer. The inventive method employed does not use the power computation in conjunction with a symmetric interferogram measurement. This approach has been considered, but the limitations of power computation and in particular its inability to process noise are too severe for use in a high performance interferometer spectrometer. The inventive method solves in a reliable and practical manner the following four equations $$S(\sigma)\cos(\phi[\sigma]) = \int_{x_1}^{x_2} I_s(x)\cos(2\pi\sigma x)dx \qquad \text{[Eq. 26]}$$

$$S(\sigma)\sin(\phi[\sigma]) = \int_{x_1}^{x_2} I_a(x)\sin(2\pi\sigma x)dx \qquad \text{[Eq. 27]}$$

$$S_{Re}(\sigma) = \int_{x_1}^{x_2} I(x)\cos(2\pi\sigma x)dx \qquad \text{[Eq. 28]}$$

$$S_{Im}(\sigma) = \int_{x_1}^{x_2} I(x)\sin(2\pi\sigma x)dx \qquad \text{[Eq. 29]}$$

The present approach is accurate with the smallest possible approximation steps and maintains the complex (asymmetric and symmetric noise separation) nature of the noise information. The present method is easily automated for use by one who is not particularly expert in Fourier analysis and mathematics.

Figure 6:
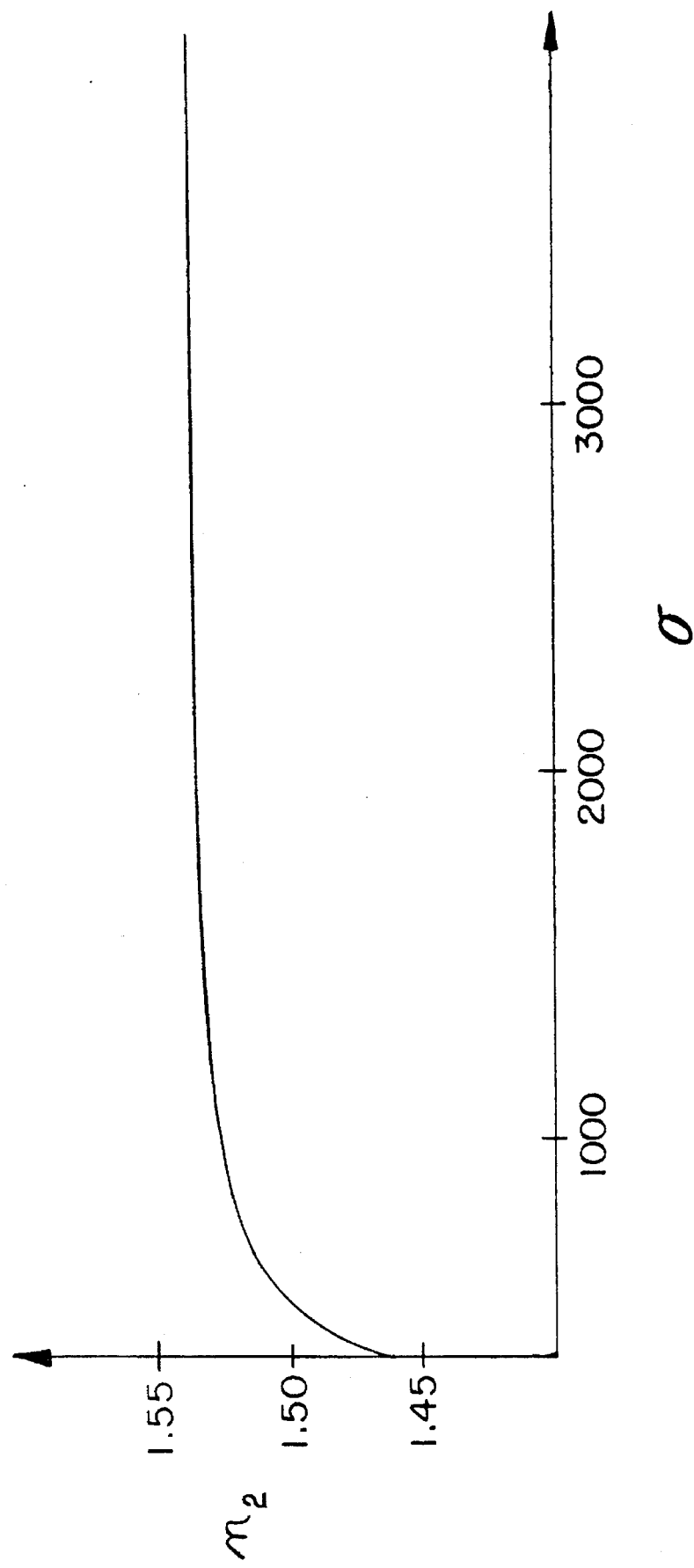
FIG. 6 shows graphically the variation of index of refraction $n_2$ of KBr over the spectral range of interest.

The method of the present invention is developed from Eqs. 26–29. These equations are pure in the sense that no approximations had been made in their derivation. The goal of the present analysis is the accurate computation of the spectrum as a function of wavenumber, given the measured information of the interferogram. In this analysis, the phase term as a function of wavenumber is determined from known physical parameters and properties of the substrate. The following Eqs. 30–34 summarize the derivations developed in this analysis that can be used in calculating the phase term at each wavenumber. In these equations, $\phi(\sigma)$ is the phase term; $\theta_2$ is the angle of propagation in the substrate; is the wavelength; $n_2$ is the index of refraction of the substrate; and $z_s$ is the distance traversed in the substrate from FIG. 6.

$$\phi(\sigma) = 2\pi\sigma z_s \qquad \text{[Eq. 30]}$$

$$\theta_2 = \arcsin\left(\frac{n_1\sin[\theta_1]}{n_2}\right) \quad \text{[Eq. 31]}$$

$$z_s = 2n_2 d\cos(\theta_2) - 2d\cos(-\theta_2 + \theta_1)\cos(\theta_2) \quad \text{[Eq. 32]}$$

$$\lambda = \frac{1}{\sigma 0.0001} \quad \text{[Eq. 33]}$$

$$n_2^2 = 1.3941 + \frac{0.79221\lambda^2}{\lambda^2 - 0.146^2} + \frac{0.01981\lambda^2}{\lambda^2 - 0.173^2} + \quad \text{[Eq. 34]}$$

$$\frac{0.15587\lambda^2}{\lambda^2 - 0.187^2} + \frac{0.17673\lambda^2}{\lambda^2 - 60.61^2} + \frac{2.0617\lambda^2}{\lambda^2 - 87.72^2}$$

These equations contain all the information needed for this computation. Although these equations are rather complex, these computations can be performed quickly in comparison to the total computation time of the spectrum by low cost computers commercially available today.

It might seem that full knowledge of the dispersion phase term would be sufficient to calculate the correct spectrum result directly. In fact, this is feasible in practice. However, there are a few obstacles to the direct computation of the result. First, there are always additional, generally small phase errors introduced by the analog electronics and the analog-to-digital conversion process. It is not possible to design a high performance analog anti-aliasing filter with zero phase distortion. The analog-to-digital conversion is a discrete sampling step, and it is not possible to design a system that accurately samples the interferogram exactly at $x=0$ and symmetrically about that point. An even larger phase distortion can arise from the frequency response characteristics of the detector. Therefore, even if the very large phase term introduced by the substrate is compensated for, correction will still be necessary for smaller errors.

To solve the two-fold problem, the method of the present invention uses a forward Fourier-transform from the interferogram domain to the frequency domain expressed as an intermediate spectrum in terms of the following two equations in preparation for the numerical compensation $$S_{IRe}(\sigma) = \int_{x_1}^{x_2} I(x)\cos(2\pi\sigma x)dx \quad \text{[Eq. 35]}$$

$$S_{IIm}(\sigma) = \int_{x_1}^{x_2} I(x)\sin(2\pi\sigma x)dx \quad \text{[Eq. 36]}$$

Figure 13:
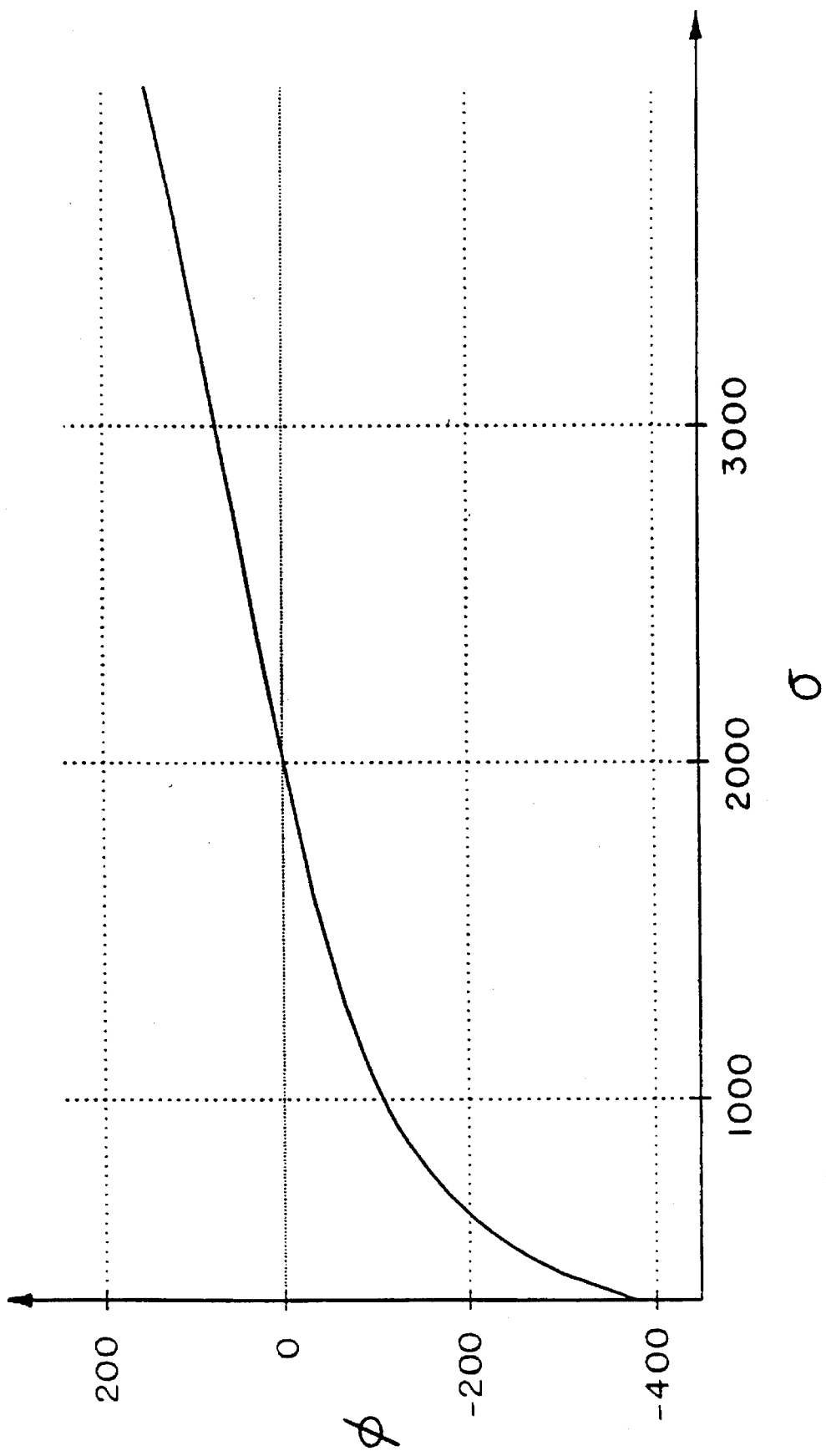
FIG. 13 is a graphic illustration of the variation of phase angle with wavenumber for a 1 cm thick KBr beamsplitter over the prime spectral region of interest.

This intermediate spectrum poses a rapidly varying phase component. A graph of the resulting spectrum would be similar to the complex spectrum shown in FIG. 9 except that the rate of rotation with respect to the wavenumber axes would be much faster. In the example of FIG. 9 showing the typical phase roll corrected by the Mertz algorithm, the wavenumber distance for a roll of $2\pi$ radians is several thousand wavenumbers. In the non-compensated case, the phase roll is typically on the order of $2\pi$ radians per 5 wavenumbers. FIG. 13 is a graphic illustration of the phase roll term for the non-compensated interferogram in a more manageable fashion than that shown in FIG. 9. In FIG. 13, the phase angle $\phi$ is plotted (in units of radians) versus wavenumbers over the spectral region of interest. This plot demonstrates that the phase roll is too rapidly varying to be handled by a Mertz-like algorithm.

In order to obtain the graphic representation of FIG. 13, a modification to the following equation is needed $$\phi(\sigma) = 2\pi\sigma z_s \quad (37)$$

The graph of FIG. 13 is a typical result from the simple Fourier analysis for a non-compensated interferogram such as that shown in FIG. 12. However, the phase predicted by Eq. 37 is dominated by the wavenumber modifier ($\sigma$ times $z_s$). A simple plot of this equation is a very steep line that will appear straight on any plot of practical scale. This characteristic is actually not of interest, it only represents the fact that the central region of the interferogram is shifted by the entire optical thickness increment of the substrate. To remove this effect, an arbitrary wavenumber is chosen to define a zero phase shift, and the optical thickness of the substrate at that wavenumber is then computed using Eqs. 26–29. The calculated optical thickness which is a constant is then subtracted from $z_s$ which varies with wavenumber. If one performs these computations for the examples shown, $z_{2000}$ is 1.0316 cm. The following equation expresses this operation mathematically $$\phi_c = 2\pi\sigma(z_s - z_{2000}) \quad (38)$$

The corrected phase term is the proper term when one considers the fact that all of the cosine terms have nearly the same (large) amount (in this example about 12,000 radians). This means that the measured interferogram appears at a shifted point on the scan (in the example about 1 cm from the theoretical point if no substrate were present). But this shift is of no interest because the interferogram scan will be centered around the shifted interferogram. In fact, it is necessary to compute the phase with the ZPD offset correction as shown in Eq. 38. A convenient way to determine the ZPD offset is to select an arbitrary wavenumber, such as for example at the center of the spectral region of interest. The increased optical thickness ($z_s$) of the substrate is then calculated at that wavenumber. The constant thickness is then subtracted from the increased optical thickness at all wavenumbers, with the net result being the determination of an arbitrary zero phase wavenumber (in this example 2,000 cm$^{-1}$) from which the phase of other spectral points may be measured.

The next step in the inventive method is to rotate the resulting complex intermediate spectrum given by the following $$S_1(\sigma) = \int_{x_1}^{x_2} I(x)e^{2\pi i\sigma x}dx \quad \text{[Eq. 39]}$$

by the negative of the corrected phase angle. The rotation step is similar to that shown graphically in FIG. 11, except that the variation of angle with respect to wavenumber is much faster. A mathematical representation of this step is shown in both complex notation and in terms suitable for simple cosine and sine Fourier-transform by the following equation.

$$S_{IC} = \cos\phi_c + i\sin(\phi_c[S_{IRe}(\sigma) + iS_{IIm}(\sigma)]) \quad (40)$$

Figure 14:
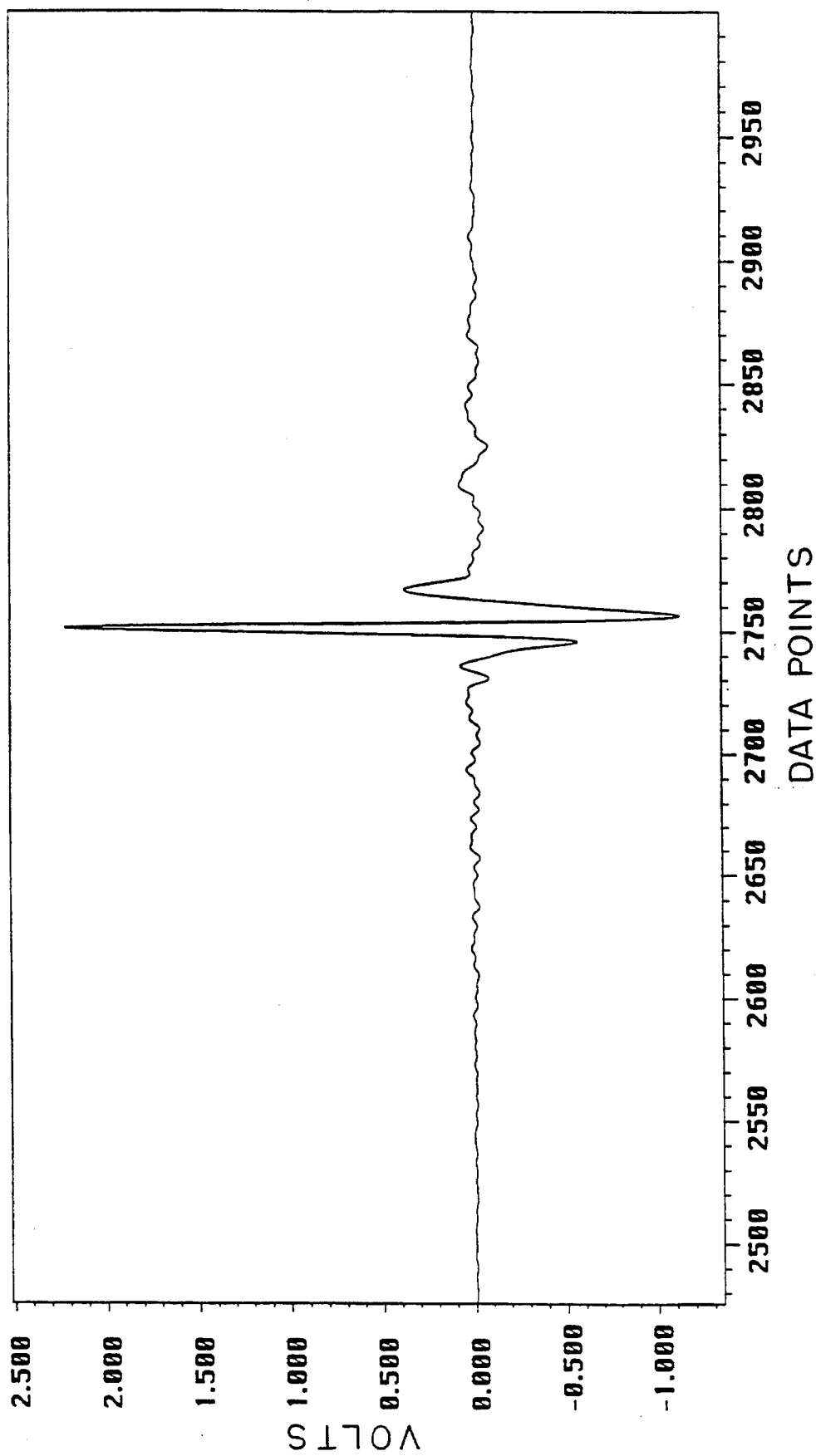
FIG. 14 illustrates a numerically compensated interferogram as measured by an interferometer without an optical compensator in accordance with the present invention.

The next step in the inventive method is performed by computing the inverse Fourier transform on the corrected intermediate spectrum, noting that the interferogram is a real function (no imaginary data point may be measured). The intermediate spectrum is computed in a complex fashion as a shorthand method to keep track of symmetric and asymmetric contributions of the interferogram. The inverse Fourier-transform transforms the corrected intermediate spectrum back to a real interferogram. If the phase rotation step had not been performed, the inverse Fourier-transform would result in recomputation of the original interferogram. However, the rotation by the negative of the phase angle introduced by the substrate removes the effects of the substrate and the result is a numerically compensated interferogram. The compensated interferogram is a close, if not exact, approximation to the interferogram that would be obtained from an ideal interferometer with no substrate present. FIG. 14 is a graphic illustration of the application of these correction steps when applied to the asymmetric interferogram of FIG. 12.

The corrected interferogram is generated using the following equation $$I_c(x) = \int_{\sigma_1}^{\sigma_2} e^{-\phi c}(S_1[\sigma])e^{-2\pi i \sigma x}dx \qquad [\text{Eq. 41}]$$

The corrected interferogram contains all of the correct noise information and the remaining small phase errors arising from the detector, electronics and other experimental effects. The final step of the inventive method is to perform the normal interferogram Fourier analysis using the Mertz phase correction method to correct for the remaining small phase errors and separate the asymmetric noise term from the resulting spectrum. The following equations $$I_c(x) = \int_{\sigma_1}^{\sigma_2} e^{-\phi c}(S_1[\sigma])e^{-2\pi i \sigma x}dx \qquad [\text{Eq. 42}]$$

$$I_c(x) = \int_{\sigma_1}^{\sigma_2} e^{-\phi c}([S(\sigma)e^{i\phi c}][e^{-2\pi i \sigma x}])dx$$

$$I_c(x) = \int_{\sigma_1}^{\sigma_2} (S[\sigma]e^{-2\pi i \sigma x})dx$$

demonstrate the results mathematically, showing that to an approximation, ignoring noise, the corrected interferogram is a clean Fourier-transform of the desired spectrum. This approximation does not adversely affect the results because the corrected interferogram is in a form allowing for normal processing via the Mertz method and the correction of remaining terms.

It should be noted that the step of the inverse Fourier transform back to the corrected interferogram may be avoided. An alternative method would involve combining the Mertz phase rotation in a single process with the numerical compensation phase rotation. This step, as well as other variations of the steps in the method described above, are possible because for most mathematical processes in the frequency domain there exists a well-defined equivalent in the time domain and vice versa.

Another equivalent approach avoids the use of the equations that define the phase angle arising from the substrate versus wavenumber. There are several ways to determine the phase angle either empirically or by direct measurement using the interferometer itself. For example, the interferometer spectrometer may be scanned with a clear beam, with no sample interference, and the resulting asymmetric interferogram saved in computer memory. A Fourier analysis, with no correction could then be performed to measure the substrate dispersion phase angles with respect to wavenumber. The scan could consist of many co-added scans to reduce the noise contribution or could be smoothed to arrive experimentally at a substantially noise-free phase angle curve such as that shown in previously discussed FIG. 13. The experimentally derived curve could be used in place of the theoretical functions derived in this analysis for arriving at substantially the same result.

Figure 15:
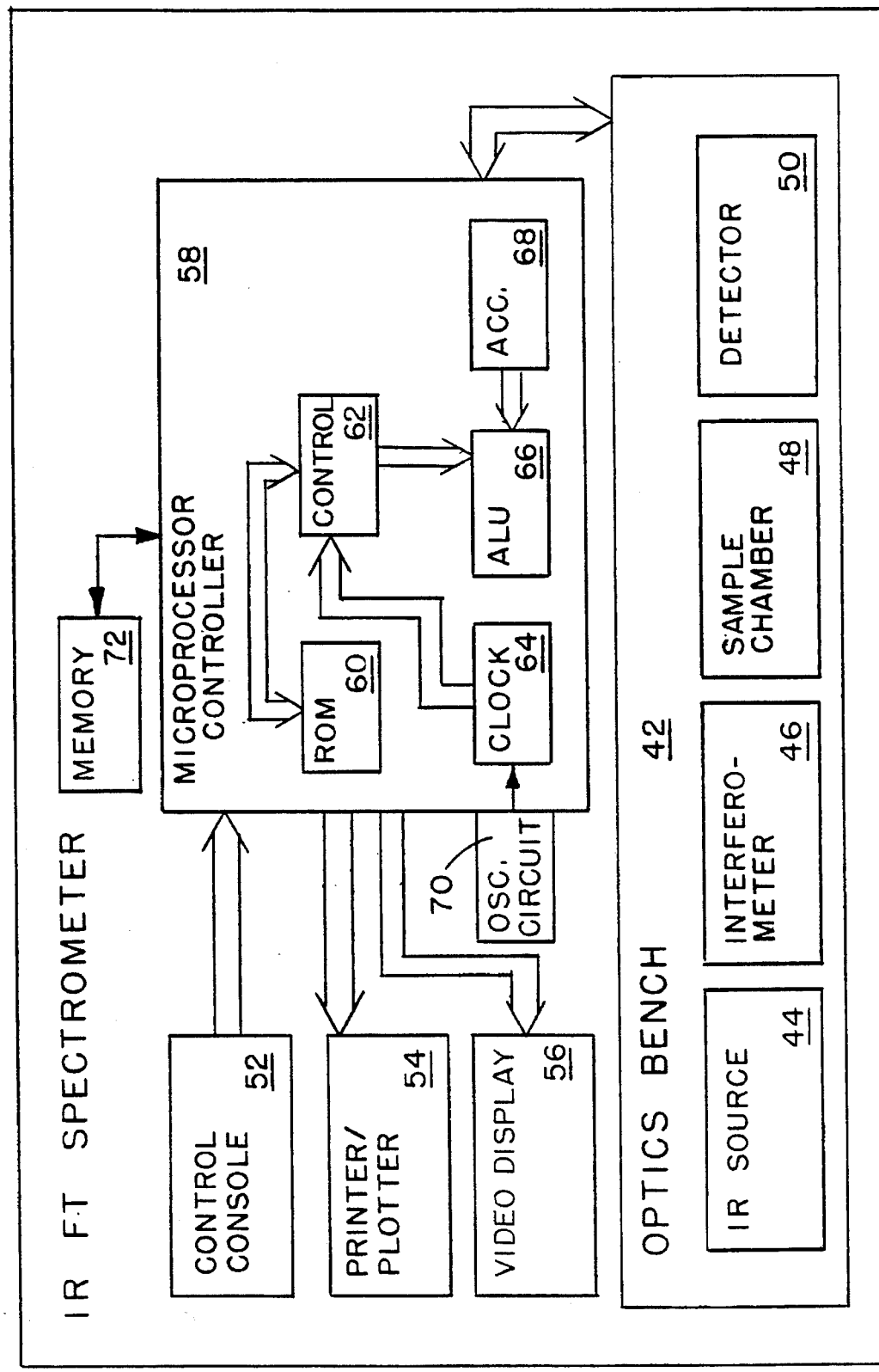
FIG. 15 is a simplified block diagram of an IR FT spectrometer for carrying out the present invention.

Referring to FIG. 15, there is shown an IR Fourier-transform (FT) spectrometer 40 for carrying out the present invention. Spectrometer 40 is conventional in design and operation with the exception that it does not include an IR beam compensator and in its operation has been modified as described above. Operation of the spectrometer 40 is under the control of a microprocessor controller 58. An operator of the spectrometer provides various input commands and data via a control console 52 to spectrometer 40 for use by its microprocessor controller 58. Output data from the spectrometer 40 may be provided either on a printer/plotter 54 for a hard copy of the data or may be presented on a video display 56 such as a cathode ray tube (CRT) for viewing by a user, or both modes of data presentation may be employed.

Microprocessor controller 58 may be conventional and is programmed to carry out the operations described above. Microprocessor controller 58 includes a ROM 60, a clock 64, an arithmetic and logic unit (ALU) 66, an accummulator (ACC) 68, and a controller 62. An oscillator circuit 70 external to the integrated circuit (IC) microprocessor controller 58 provides timing signals to clock 64 for controlling the timing of operations carried out by the microprocessor. Program instructions and data are stored in ROM 60. Microprocessor controller 58 is coupled to an external memory 72 for the storage of instructions and data therein as well as for reading instruction and data therefrom. When the FTIR spectrometer 40 is turned on, the microprocessor program stored in ROM 60 causes binary signals representing instructions stored in the ROM to be provided to controller 62 and causes various other portions of the microprocessor controller 58 to be initialized for proper future operation. ALU 66 receives binary control signals from controller 62 and performs the required arithmetic or logic operation.

The IR FT spectrometer 40 further includes an optics bench 42 comprised of an IR source 44, an interferometer 46, a sample chamber 48, and a detector 50. A detailed description of the configuration and operation of an FTIR spectrometer 40 having an optics bench 42 capable of carrying out the present invention is set forth in co-pending application, Ser. No. 06/020,522 entitled IMPROVED SPECTROMETER AND INTERFEROMETER THEREFOR, filed Feb. 22, 1993, in the name of David R. Mattson et al. and assigned to the assignee of the present application. The aforementioned application is hereby incorporated by reference in this application.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A Fourier transform infrared (IR) spectrometer wherein an IR beam is directed onto a sample for providing either a reflectance or absorbance spectrum of the sample, said spectrometer comprising:

a beamsplitter responsive to an input IR beam incident thereon for substantially equally dividing said input IR beam into a first reflected beam portion and a second transmitted beam portion;

a first reflector aligned with said first reflected beam portion for directing said first reflected beam portion back onto said beamsplitter, wherein said first reflected beam portion is partially reflected and partially transmitted by said beamsplitter;

a substrate engaging said beamsplitter for providing support and stable positioning for said beamsplitter, wherein said input IR beam is directed through said substrate and onto said beamsplitter;

a second reflector aligned with said second transmitted beam portion for directing said second transmitted beam portion back onto said beamsplitter, wherein said second transmitted beam portion is partially reflected and partially transmitted by said beamsplitter, wherein the first and second beam portions are combined to form an output IR beam and wherein said output IR beam is uncompensated due to a difference in optical paths travelled by said first and second beam portions;

displacement means coupled to one of said first or second reflectors for moving said one of said first or second reflectors for providing an interference pattern in said uncompensated output IR beam, wherein said uncompensated output IR beam is directed onto said sample for obtaining a spectrum of the sample;

signal processing means responsive to said uncompensated output IR beam after transmission through or reflection from said sample in providing an uncompensated sample interferogram for transforming said uncompensated interferogram into a compensated interferogram by Fourier-transforming said uncompensated interferogram from a time domain to frequency domain to provide a complex intermediate spectrum, rotating the complex intermediate spectrum in a complex plane by a negative of a corrected phase angle arising from said substrate to provide a corrected complex intermediate spectrum, inverse Fourier transforming said corrected complex intermediate spectrum to form a corrected real compensated intermediate interferogram, and Fourier transforming the corrected real compensated intermediate interferogram to correct for small phase errors in providing a final spectrum.

2. The spectrometer of claim 1 wherein said signal processing means includes means for shifting a central region of the spectrum of said uncompensated output IR beam in frequency a given wavenumber equal to an optical thickness of said substrate in providing said complex intermediate spectrum to compensate for substrate thickness.

3. The spectrometer of claim 2 wherein said signal processing means further includes means for computing a low resolution complex Fourier transform and then a full resolution complex Fourier transform of said corrected real compensated intermediate interferogram in Fourier transforming said corrected real compensated intermediate interferogram.

4. In a spectrometer including a Michelson interferometer wherein an input IR beam is directed through a substrate and a beamsplitter attached for support said beamsplitter, wherein said beamsplitter divides said input IR beam into a first beam portion incident upon a fixed reflector and a second beam portion incident upon a movable reflector, with said first and second beam portions then recombined to provide an uncompensated output IR beam incident upon a sample and received by a detector to provide an uncompensated interferogram of the sample, a method for converting said uncompensated interferogram to a compensated interferogram in correcting for phase errors arising from transit of said output IR beam through said substrate, said method comprising steps of:

measuring the sample's uncompensated interferogram;

computing a complex Fourier-transform of said uncompensated interferogram in converting said interferogram from a time domain to a frequency domain and providing a complex intermediate spectrum;

calculating a corrected phase angle in terms of wavenumber for the complex intermediate spectrum arising from an optical thickness of the substrate;

rotating said complex intermediate spectrum by a negative of said calculated corrected phase angle to form a corrected complex intermediate spectrum;

computing an inverse Fourier transform of said corrected complex intermediate spectrum to provide a corrected real compensated intermediate interferogram; and Fourier transforming said corrected real compensated intermediate interferogram to correct for small phase errors in providing a final spectrum.

5. The method of claim 4 wherein the step of calculating a corrected phase shift includes applying a Fourier analysis on a small portion of said uncompensated interferogram symmetrically about an estimated point of zero retardation.

6. The method of claim 5 wherein the step of calculating said corrected phase shift further includes shifting a central region of the spectrum of said uncompensated interferogram in frequency a given wavenumber equal to an optical thickness of the substrate in forming said complex intermediate spectrum to compensate for substrate optical thickness.

* * * * *